United States Patent [19]

Harigaya et al.

[11] 4,201,463
[45] May 6, 1980

[54] PHOTOGRAPHIC CAMERA DEVICE

[75] Inventors: Isao Harigaya, Yokohama; Tetsuya Taguchi, Kawasaki; Fumio Ito; Mutsunobu Yazaki, both of Yokohama, all of Japan

[73] Assignee: Canon Kabushiki Kaisha, Tokyo, Japan

[21] Appl. No.: 905,883

[22] Filed: May 15, 1978

[30] Foreign Application Priority Data

May 17, 1977 [JP] Japan .................................. 52-56942
Jun. 10, 1977 [JP] Japan .................................. 52-68634
Jun. 14, 1977 [JP] Japan .................................. 52-70076

[51] Int. Cl.² ...................... G03B 15/05; G03B 17/52
[52] U.S. Cl. .................................... 354/86; 354/145; 354/149; 354/173; 354/266
[58] Field of Search .................... 354/33, 60 R, 83, 84, 354/85, 86, 127, 128, 139, 145, 149, 171, 173

[56] References Cited

U.S. PATENT DOCUMENTS

| | | | |
|---|---|---|---|
| 3,810,212 | 5/1974 | Biber | 354/145 X |
| 3,846,812 | 11/1974 | Biber | 354/145 |
| 4,126,877 | 11/1978 | Ohtaki et al. | 354/60 R X |

*Primary Examiner*—Michael L. Gellner
*Attorney, Agent, or Firm*—Toren, McGeady and Stanger

[57] ABSTRACT

The present invention relates to a photographic camera device in which current is supplied to the winding up motor device for automatically advancing the film and cocking the shutter and to a rechargeable electronic flash light device from a single common power source battery. The camera is provided with a voltage detecting device for detecting the voltage of the power source battery, and a control device for simultaneously supplying current to the winding up motor device and the flash light device when the power source voltage detected by the voltage detecting device is higher than a certain determined voltage, and for preventing current flow to the flash light device while the current is being supplied to the winding up motor device when the detected power source voltage is lower than the determined voltage. A further device prevents the operation of the trigger button when the power source voltage is not sufficient for operating the winding up motor device in the normal way, and also prevents the winding up motor device as well as the flash light device from being substantially operated.

13 Claims, 20 Drawing Figures

F I G.2
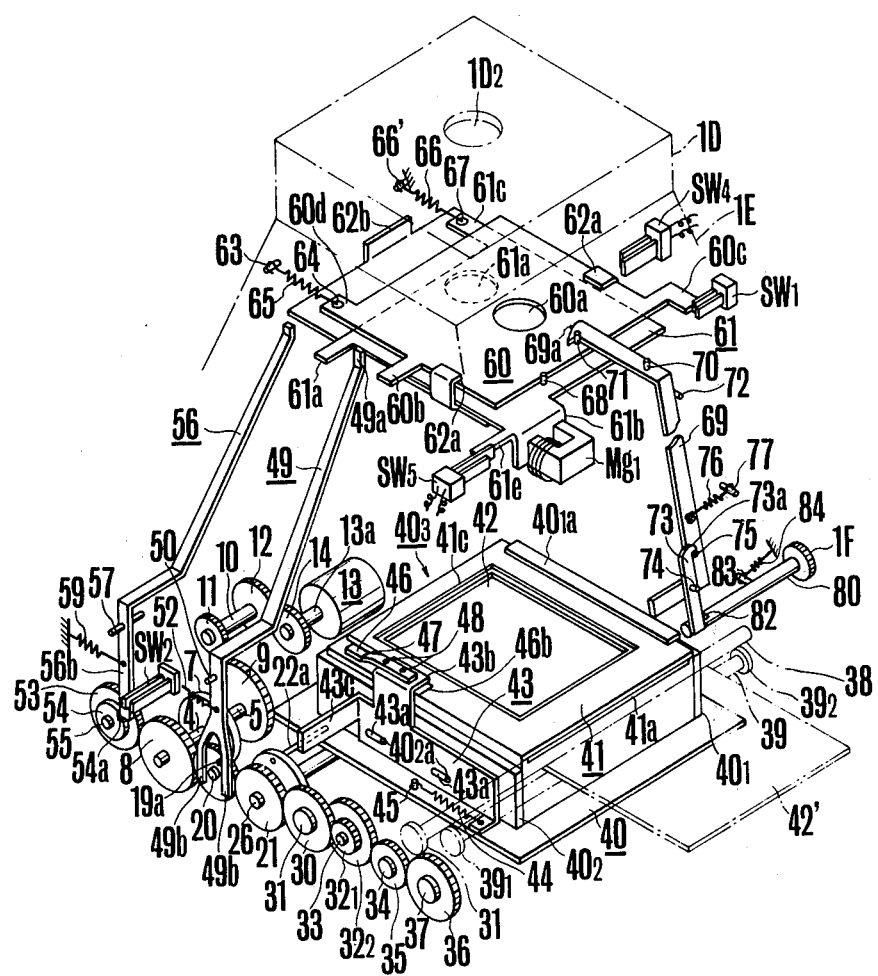

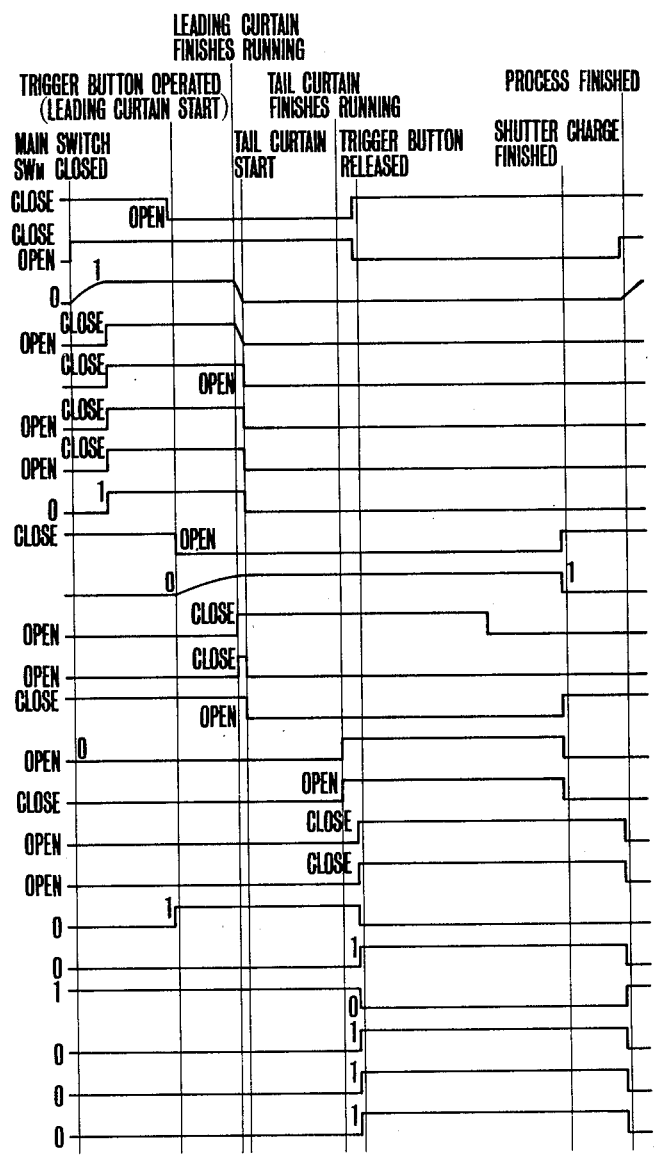

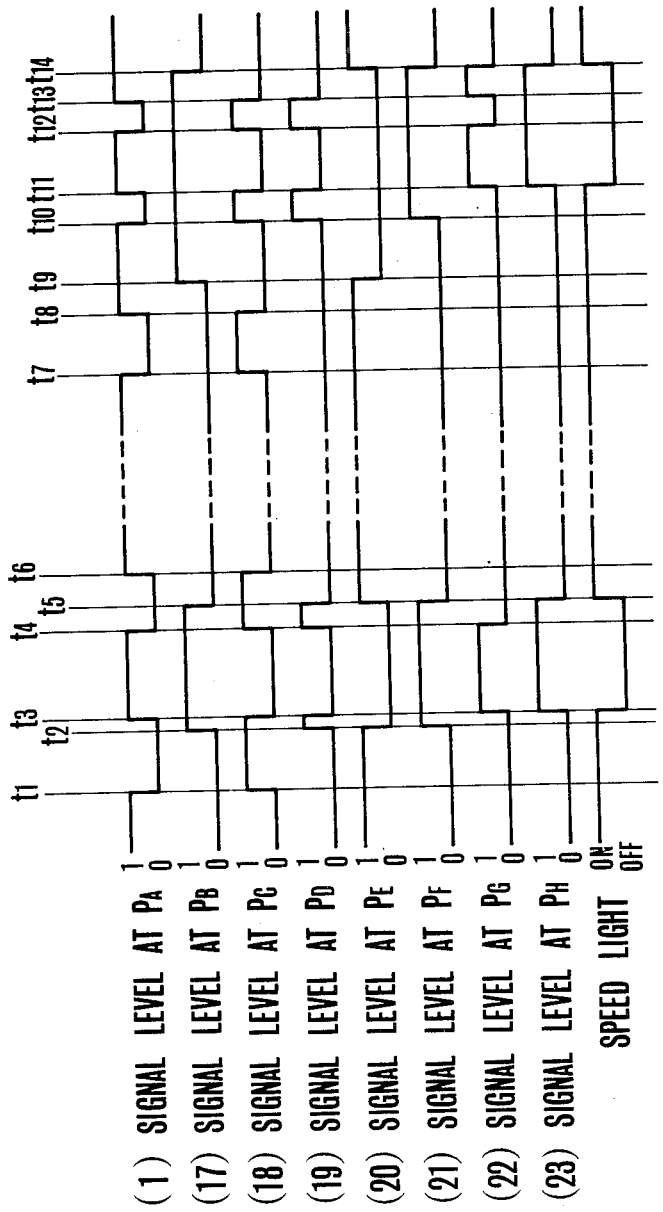

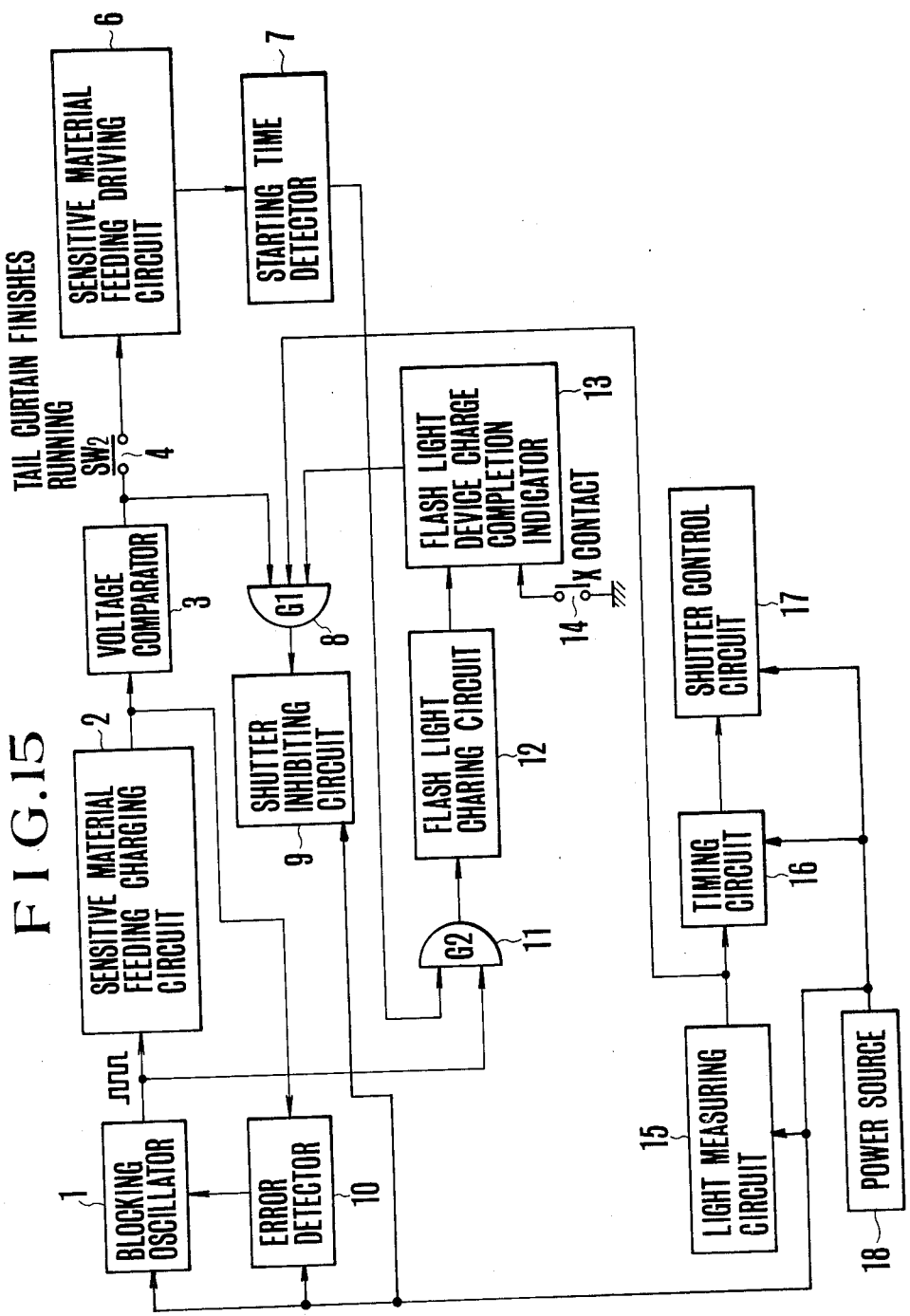
F I G. 15

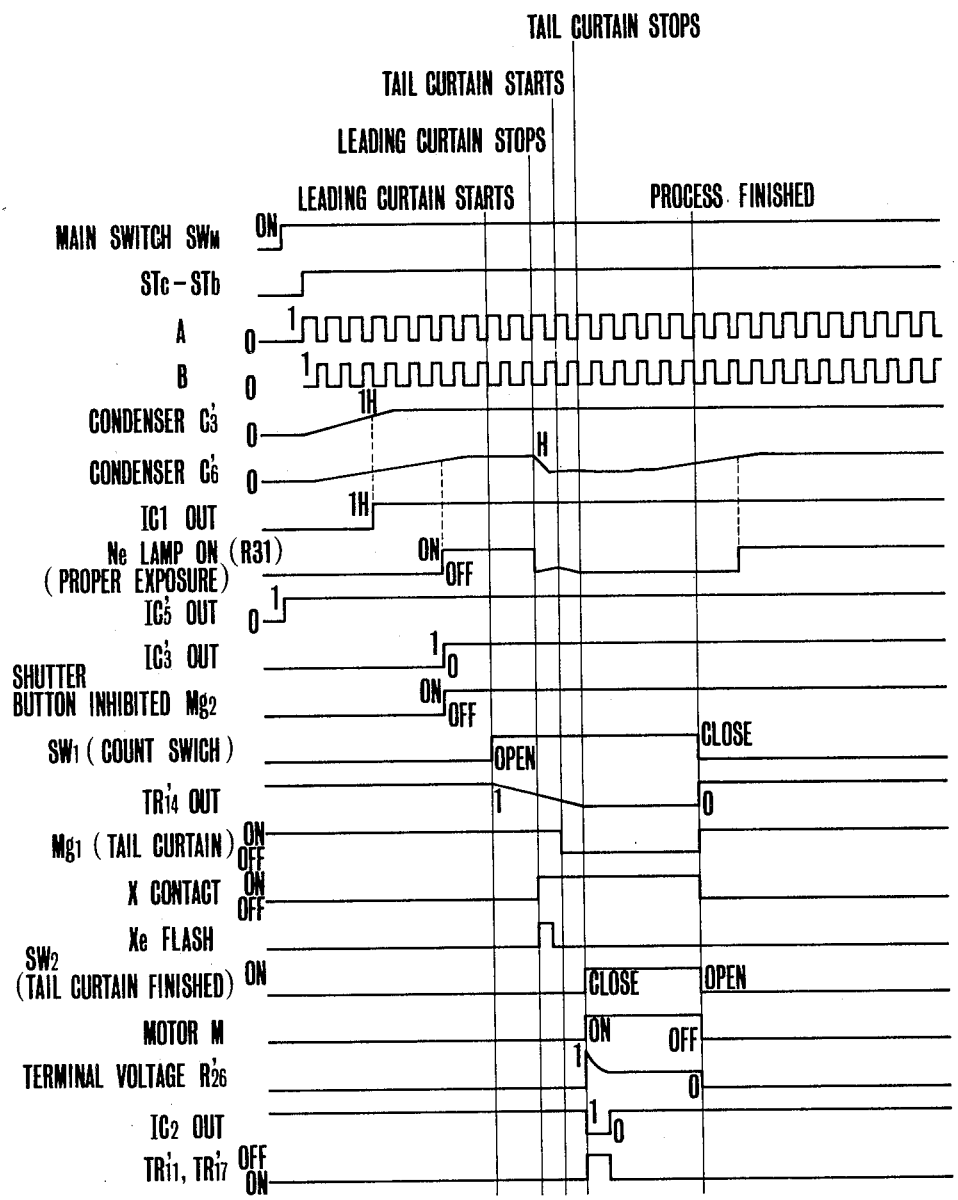

PHOTOGRAPHIC CAMERA DEVICE

BACKGROUND OF THE INVENTION

1. Field of the Invention

The present invention relates to a photographic camera device so designed that the current is supplied both to a winding up motor device for automatically carrying out the advancing of a photographic roll film or a photosensitive sheet material of self developing type sheet film and the cocking of the shutter and to a rechargeable electronic flash light device from a single common power source battery.

2. Description of the Prior Art

Many photographic camera devices are designed so that the current is supplied to a winding up motor device for automatically advancing the film and for cocking the shutter and to a rechargeable electronic flash light device from a single common power source battery. It is advantageous in a compact camera to supply the current to the flash light device and the film advance motor from a common power source, because the space occupied by the power source in the camera can be made small. In a camera in which the current is supplied to the flash light device and the photosensitive material feeding motor from a common power source, no problem takes place even when the current is simultaneously supplied to the flash light device and the photosensitive material feeding motor where the power source voltage is higher than a certain determined value which is sufficient for operating the winding up motor device and the flash light device at the same time in the normal way. On the other hand, when the current is supplied to the flash light device and the winding up device at the same time where the power source voltage is lower than the determined value, the current to be supplied to the motor is reduced because the current is supplied both to the flash light device and the motor, in such a manner that there is a danger that the motor should start late or rotate slowly or at an inconstant speed. It is clear that the above is not desirable in any type of camera, whereby it is a large problem particularly, for a camera generally called "Instant photographic camera" in which a sheet-like photosensitive material of self-development-processing type is used.

The sheet-like photosensitive material of self-development-processing type as well as the camera generally called "Instant photographic camera" in which the sheet-like photosensitive material is used are well known in the prior art. When this sheet-like photosensitive material is taken out of the camera after exposure, the container of the development-processing solution is broken, whereby the development-processing solution coming out of the container is spread over the surface of the photosensitive material so as to carry out the self-development-processing. A number of the sheet-like photosensitive films are contained in a pile in a film cartridge and are loaded at the exposing part in the camera together with the cartridge. On the other hand, an instant photographic camera using the above mentioned cartridge is disclosed in the U.S. Pat. No. 3,689,262, whereby each time one sheet-like photosensitive film in the cartridge has been exposed, the photosensitive material is brought out of the exposing part in the camera by means of the photosensitive material transportation mechanism. When the sheet-like photosensitive material is brought out of the camera by means of the photosensitive material transportation mechanism, the sheet-like photosensitive material passes through the press rolls of the photosensitive material transportation mechanism, whereby the development-processing solution container in the sheet-like photosensitive material is broken under the pressure of the rolls in such a manner that the development-processing solution is spread over the surface of the photosensitive material out of the container. When the sheet-like photosensitive material passes through the above mentioned press rolls, the development-processing solution coming out of the container is distributed evenly over the surface of the photosensitive material. Hereby, the aforementioned photosensitive material transportation mechanism is driven by means of a motor, whereby it is very important to distribute the development processing solution quite evenly over the sheet-like photosensitive material of self development-processing type in order to obtain a nice picture. In order to distribute the development processing solution evenly over the surface of the photosensitive material, it is essential that the sheet-like photosensitive material should pass through the press rolls at a constant speed.

The U.S. Pat. No. 3,846,812 discloses a photographic camera device so designed that, in order to prevent the motor in the winding up device from running at any speed other than the determined one due to the voltage drop when the current is supplied to the winding up device and the electronic flash light device, the sequence control is carried out in such a manner that first the flash light device is triggered in order to expose the film, then the winding up device for feeding the film and charging the shutter is triggered and the flash light device is recharged when the operation of the winding up device has been terminated.

However, in accordance with the technical content disclosed in the U.S. Pat. No. 3,846,812, the flash light device is recharged when the film feeding and the shutter charging have been terminated. Consequently, there is a problem that continuous photograph is impossible because the winding up device operates after the trigger button is operated and the flash light device starts to be charged after the termination of the winding up device.

SUMMARY OF THE INVENTION

The first purpose of the present invention is to offer a photographic camera device in which the current is supplied to the winding up motor device for automatically advancing the film and charging the shutter and the rechargeable electronic flash device from a single power source battery, the camera being designed in such a manner that the terminal voltage of the power source battery is detected to determine whether the detected voltage is higher than the standard one so that the current may normally be supplied simultaneously to the winding up motor device and the flash light device so as to shorten the time necessary for the continuous photographing, while if the detected voltage is lower than the standard one the current supply system to the winding up motor device and the flash light device can automatically be changed over to be supplied with current sequentially.

The second purpose of the present invention is to offer a photographic camera device in which the current is supplied to the photosensitive material feeding device and the rechargeable electronic flash light device from a single common power source circuit, being provided with a current supply control means by means of which the current is supplied to the flash light condenser for storing the current for operating the flash light device and the photosensitive material feeding condenser for storing the current for operating the photosensitive material feeding device alternatively from the single common power source circuit.

The third purpose of the present invention is to offer a photographic camera device in which the current is supplied to the photosensitive material feeding device and the rechargeable electronic flash light device from a single common power source circuit, being provided with a current supply control means by means of which the current is supplied to the flash light condenser for storing the current for operating the flash light device and the photosensitive material feeding condenser for storing the current for operating the photosensitive material feeding device alternatively from the single common power source circuit and a means by means of which the photosensitive material feeding device is automatically driven with the power stored in the photosensitive material feeding condenser when the flash light device has been operated with the power stored in the flash light condenser.

The fourth purpose of the present invention is to offer a photographic camera device in which the current is supplied to the photosensitive material feeding device and the rechargeable electronic flash light device from a single common power source circuit, being provided with a current supply control means by means of which the current is supplied to the flash light condenser for storing the current for operating the flash light device and the photosensitive material feeding condenser for storing the current for operating the photosensitive material feeding device alternatively from the single common power source circuit and a change-over means by means of which the current supply to the flash light condenser is prohibited in case of the daylight photography.

The fifth purpose of the present invention is to offer a photographic camera device in which the current is supplied to the photosensitive material feeding device and the rechargeable electronic flash light device from a single common power source circuit, being provided with a flash light condenser for storing the current for operating the flash light device and a means by means of which the excessive power consumption when the photosensitive material feeding device is driven, is detected so as to prohibit the current supply to the flash light condenser.

The sixth purpose of the present invention is to offer a photographic camera device being provided with a detecting means by means of which a signal is produced when the energy stored in the photosensitive material feeding condenser for storing the current for driving the photosensitive material feeding device and that stored in the flash light condenser for storing the current for driving the rechargeable electronic flash light device are below a certain determined level and a means by means of which the operation of the trigger device is prohibited by means of the output of the detecting means.

The seventh purpose of the present invention is to offer a photographic camera device in which the current is supplied to the rechargeable electronic flash light device and the photosensitive material feeding motor from a single power source, being provided with a switch means by means of which during flash light photography, the current supply to the motor is started only by means of a manual operation when the flash light photography has been finished, while the current supply to the flash light device is prohibited.

The eighth purpose of the present invention is to offer a photographic camera device in which the current is supplied to the rechargeable electronic flash light device and the photosensitive material feeding motor from a single power source, being provided with a safety device by means of which during flash light photography the trigger device of the camera is locked so as to prohibit photographing until the flash light device has been charged.

Further purposes will be clear from the explanations to be made below in detail in accordance with the accompanying drawings.

BRIEF DESCRIPTION OF THE DRAWINGS

FIG. 11 shows the timing chart of the photographing camera device shown in FIGS. 8 to 10.

FIG. 15 shows a block diagram of the circuit for controlling the photographing camera device shown in FIG. 4.

DESCRIPTION OF THE PREFERRED EMBODIMENTS

Below some of the preferred embodiments of the photographing camera device in accordance with the present invention will be explained.

Figure 1:
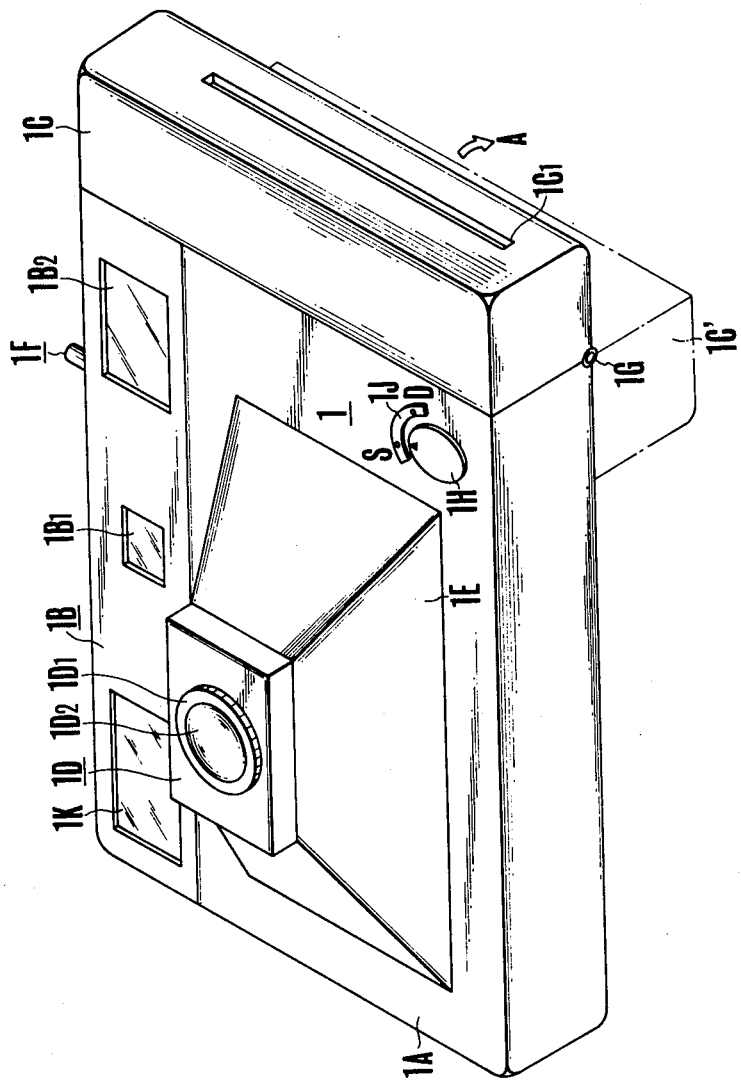
FIG. 1 shows the photographing camera device in accordance with the present invention in perspective view, whereby the perspective view is in common for explaining the embodiment of the present invention.
Figure 3:
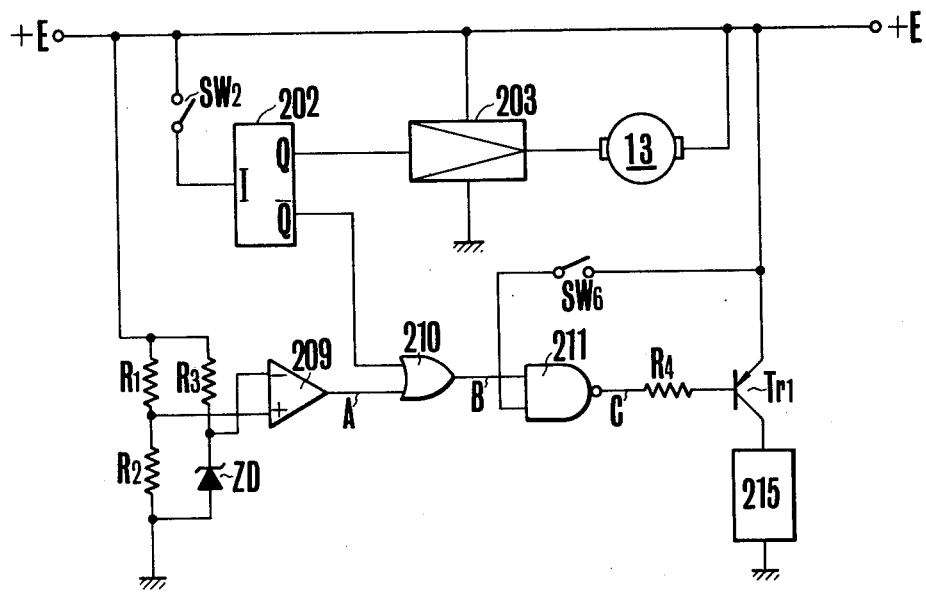
FIG. 3 shows a block diagram of the circuit for controlling the photographing camera device in accordance with the first embodiment shown in FIG. 2.
Figure 4:
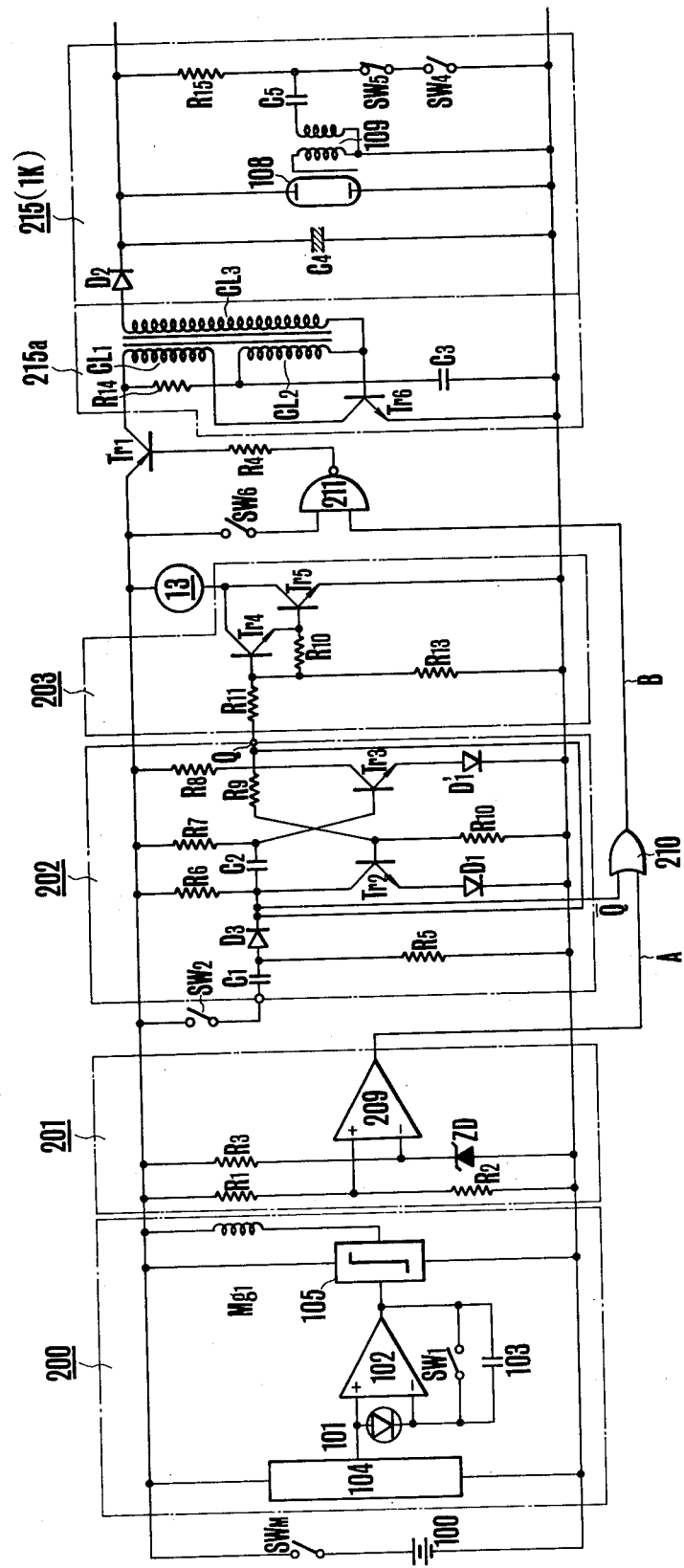
FIG. 4 shows the circuitry in the block diagram shown in FIG. 3.

FIGS. 1 to 5 show the first embodiment of the photographing camera device applied to the instantaneously photographing camera in accordance with the present invention. The appearance of this first embodiment is shown in FIG. 1, whereby 1 is the camera body, 1A the camera base body, 1B the view finder frame body, 1C the film cartridge mounting-dismounting frame body, 1D the photographing optics frame body, 1E the dark box frame body, 1F the trigger button, 1H the photographing mode change over dial for changing over from the flash light photography to the daylight photography, 1J the index plate on which the finger $1H_1$ on the dial 1J is set. When the dial 1H is set to the mark "S" the camera is prepared for flash light photography and when set to the mark "D" for day light photography, bringing the flash light device in non-operable state. When the finger $1H_1$ on the dial 1H is set on the mark "S" on the index plate 1J, the switch SW6 shown in FIG. 4 is closed, and when the finger 1H is set on the mark "D" the switch SW6 is opened. 1K is the rechargeable electronic flash light device incorporated in the camera body 1. The view finder frame body 1B is fixed on the camera base body 1A, being provided with the windows $1B_1$ and $1B_2$ for the range finder and the view finder.

The film cartridge mounting and dismounting frame 1C is connected with the camera body 1A by means of a hinge 1G, in such a manner that it may be manually rotated around the hinge 1G along the direction indicated by the arrow A until it reaches the position shown 1C' in FIG. 1, whereby the opening for loading the cartridge in the camera base body is disclosed so as to enable the loading and unloading of the film cartridge into and out of the cartridge loading chamber formed in the camera base body 1A. Further, the film cartridge mounting and dismounting frame body 1C is provided with a sensitive material discharging opening $1C_1$ through which the sheet shaped sensitive material, already exposed, is discharged by means of a sensitive material discharging device to be explained later. $1D_1$ is the lens barrel bearing the photographing lens $1D_2$ and presenting the distance setting ring for focusing, whereby the lens barrel $1D_1$ is held by means of the photographing optics frame body 1D. In the photographing optics frame body 1D, a conventional exposure adjusting mechanism (not shown in the drawing), a distance setting mechanism (not shown in the drawing) and so on are provided together with the shutter mechanism shown in FIG. 2.

Figure 5:
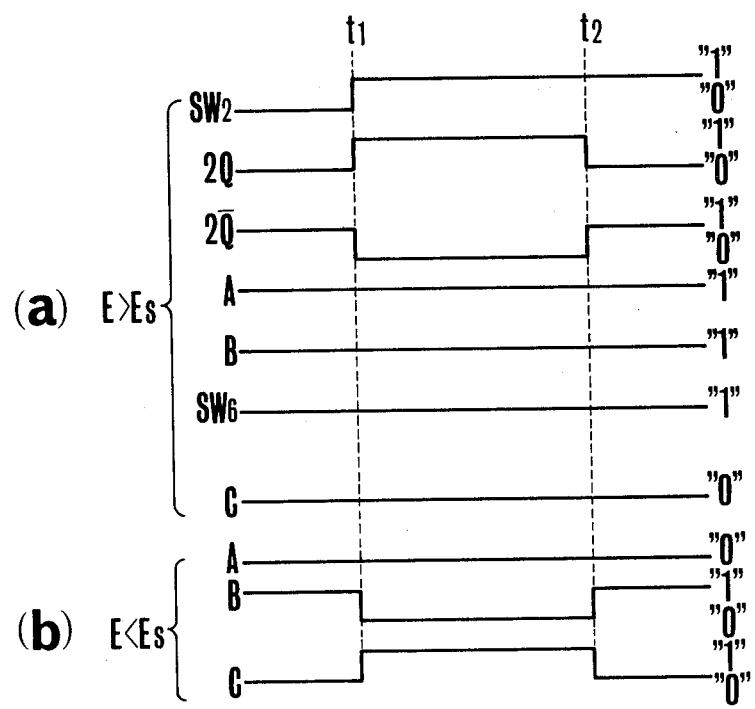
FIG. 5 shows the timing chart of the photographing camera device shown in FIGS. 2 to 4.
Figures 2, 11A:
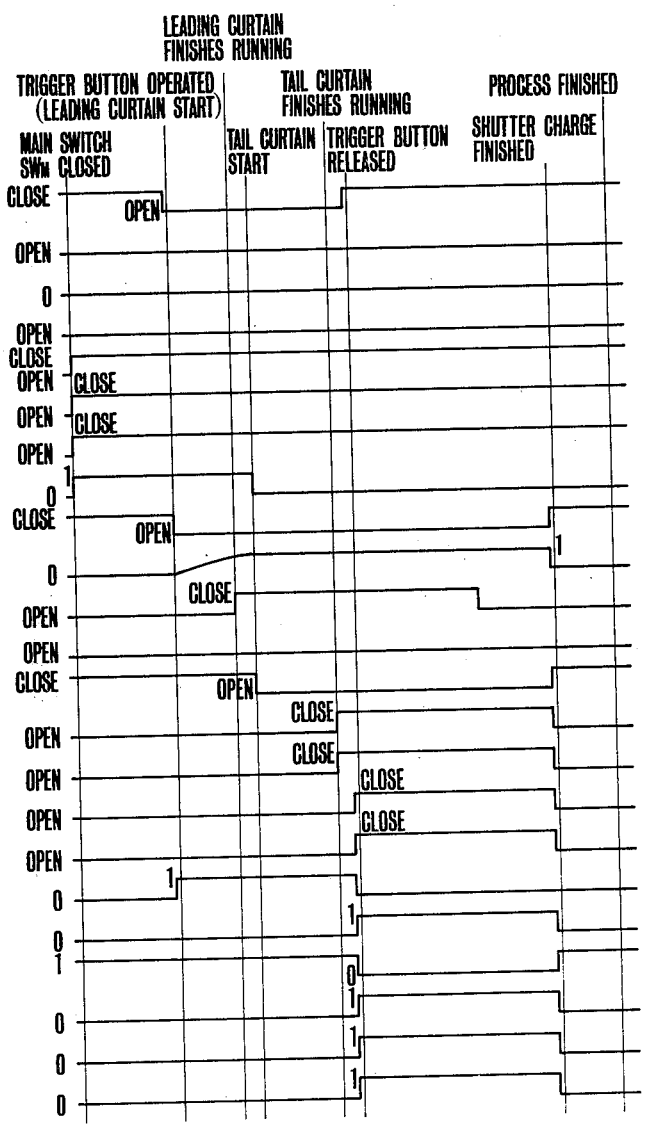
FIG. 2 shows the internal arrangement of the photographing camera device shown in FIG. 1 in perspective view.

Hereby, the internal arrangement in the first embodiment is shown in detail in FIG. 2. In FIG. 2, 4 and 5 are the rotary shafts rotatably supported in the camera base body 1A, being coaxially arranged. 8 is a spur gear secured on the rotary shaft while 7 is a one way clutch device for controlling the power transmission between the rotary shafts 4 and 5. The one way one clutch device 7 is designed so as to transfer the rotation of the rotary shaft 5 to the rotary shaft 4 when the rotary shaft 5 is rotated in the clockwise direction, whereby as the one way clutch device 7 a conventional one is used. 9 is a spur gear secured on the other end of the rotary shaft 5. 10 is a rotary shaft rotatably supported in the camera base body 1A, whereby the spur gears 11 and 12 are secured at each end of the rotary shaft 10 in such a manner that the gear 11 is normally engaged with the gear 9. 13 is an electrical motor secured on the camera body 1A while 14 is a spur gear secured on the shaft 13a of the motor 13, whereby the spur gear 14 is normally engaged with the aforementioned gear 12. 14 is a spur gear secured on the rotary shaft 20 rotatably supported on the camera base body 1A, whereby the gear 19 is normally engaged with the gear 8, and provided with a pin 19a. 21 is a spur gear normally engaged with the gear 19, being secured on the rotary shaft 26 rotatably supported on the camera base body 1A. 22 is a disc fixed on the shaft 26 on which the gear 21 is also fixed, and provided with a pin 22a. 30 is a spur gear secured on the rotary shaft 31 rotatably supported on the camera base body 1A, being normally engaged with the gear 21. $32_1$ and $32_2$ are spur gears secured on the shaft 33 rotatably supported on the camera body 1A, whereby the gear $32_1$ is normally engaged with the gear 30. 35 is a spur gear secured on the shaft rotatably supported on the camera body 1A, being normally engaged with the gear $32_2$. 36 is a spur gear secured on the shaft 37, rotatably supported on the film cartridge mounting and dismounting frame body 1C, whereby the gear 36 is engaged with the gear 35, when the film cartridge mounting-dismounting frame body 1C assumes the position shown in solid lines in FIG. 1 with reference to the camera base body 1A, and moves along with the film cartridge mounting-dismounting frame body 1 so as to be disengaged from the gear when the body 1C assumes the position shown in dash-dotted lines. 38 and 39 are a pair of sensitive material discharging rolls rotatably supported on the film cartridge mounting-dismounting frame body 1C, being positioned at a position convenient for discharging sheet shaped sensitive material having passed through the rolls 38 and 39 by the sensitive material discharging opening $1C_1$. Hereby, at the one end of the roll 38 a gear 31 is secured, being normally engaged with the gear 36. Further, spacer rolls $39_1$ and $39_2$ are fixed at both ends of the roller 39 in order to provide a gap for allowing the passage of the sheet shaped sensitive material between the rolls 39 and 38 and to obtain the rotation of the roll 38 along with the roll 38. The spacer rolls $39_1$ and $39_2$ are formed of a material such as rubber with a high friction coefficient in order to obtain the rotation of the roll 38. The gap provided between the aforementioned rolls 38 and 39 is provided in order to enable the breakage of the developing solution carrier in the sensitive material under the pressure of the rolls 38 and 39 so as to distribute the developing solution coming out of the carrier over the sensitive material surface when a self-developing type sheet shaped sensitive material with self developing processing solution carrier passes through the rollers 38 and 39. 40 is a base plate of the film cartridge containing chamber, being secured on the camera base body 1A. This base plate 40 is provided with side wall plate parts $40_1$, $40_2$ and $40_3$ on the three side planes excepting the part through which the film cartridge 41 is loaded and unloaded, while on the side wall plate part $40_1$ a control bent part $40_{1a}$ for controlling the upward movement of the film cartridge 41 loaded in the film cartridge containing chamber is formed, whereby the plate parts $40_1$, $40_2$ and $40_3$ position the cartridge 41 loaded in the cartridge containing chamber. In this cartridge 41 is a plural number of the self developing processing type sheet shaped sensitive material 42 with self developing processing solution carrier as disclosed in the U.S. Pat. No. 3,682,076, whereby the film cartridge 41 is provided with an opening 41a for discharging the exposed sheet shaped sensitive material 42, a notch 41b allowing the entry of a member for pushing the exposed sheet sensitive material 42 out of the discharging opening 41a and an opening 41c for exposing the sheet shaped sensitive material 42. On the base of the film cartridge 41, a means such as plate spring for urging a plural number of the sheet shaped sensitive material 42 contained in the film cartridge 41 toward the side of the exposure opening 41c is provided, in such a manner that when the first exposed sheet shaped sensitive material 42 has been taken out through the discharging opening 41a the next sheet shaped sensitive material 42 is moved upwards by means of the aforementioned urging means so as to automatically assume a convenient exposing position while the discharging opening 41a is so dimensioned that only one sensitive material 42 can be taken out by every sensitive material removal operation. 43 is the base plate of a pre-discharging device for taking out the sheet shaped sensitive material 42 contained in the film cartridge 41 one by one out of the discharging opening 41a and for feeding it up to the position at which the forward end of the sheet shaped sensitive material 42 is clamped between the rolls 38 and 39, providing a long guide hole 43a extending along the transportation direction of the sheet shaped sensitive material 42, a control bent part 43b for controlling the upward movement of the film cartridge 41, an engaging part 43c for engaging with the long pin 22a provided on the disc 22 and a bent part 43d to be engaged with the one end of the tension spring 44. The base plate 43 is provided in the long guide 43a so as to be engaged with the pin $40_{2a}$ provided on the side wall plate part $40_2$ of the plate 40, the plate 40 being slidable under the control of the long guide hole 43a and the pin $40_{2a}$ in the transportation direction of the aforementioned sheet shaped sensitive material 42. The one end of the afore mentioned spring 44 is engaged with the bent part 43d of the base plate 43 while the other end is engaged with the pin 45 provided on the plate 40, normally urging the base plate 43 along the direction contrary to the transportation direction of the sensitive material. 46 is the sensitive material transportation plate spring secured on the bent part 43b of the aforementioned base plate 43 by means of a set screw 48 so as to be arranged in the notch 41b of the film cartridge 41 in the cartridge containing chamber, whereby on the surface of the plate spring 46 corresponding with the sheet shaped sensitive material 42 a friction material 47 such as rubber with a high friction coefficient is provided. Hereby, the aforementioned friction member 47 which is pressed against the sheet shaped sensitive material 42 in the cartridge 41 by means of the aforementioned plate spring 46, transports the first sheet shaped sensitive material 42 in the cartridge 41 toward the sensitive material discharging opening 41a along with the slide motion of the base plate 43 along the transportation direction until the front end of the sheet shaped sensitive material 42 coming out of the sensitive material discharging opening 41a is clamped between the rolls 38 and 39. The slide motion of the aforementioned base plate 43 is produced by the rotation of the disc 22. Namely, the long pin 22a of the disc 22 and the engagement part 43c of the base plate 43 are positioned in such a manner that the engagement part 43c is engaged with the long pin 22a when the long pin 22a is rotated along with the rotation of the disc 22, whereby when the long pin 22a is rotated so as to be engaged with the engagement part 43c the base plate 43 is urged by means of the long pin 22a in the direction of the transportation so as to be brought into a slide motion until the long pin 22a is disengaged from the engagement part 43c. 49 is a shutter charge swing lever secured on the shaft rotatably supported on the camera body 1A, whereby the one end 49a of the lever 49 extends up to a position at which the end 49a is engageable with a part of the loading curtain of the shutter to be explained later, while the other end 49b is fork shaped. The parts $49b_1$ and $49b_2$ of the other end of the lever 49 are so designed that the lever 49 is rotated in the counterclockwise direction around the shaft 50 by means of the pin 19a when the pin 19a provided on the gear 19 is in contact with the part $49b_1$ and in the clockwise direction when the pin 19a is in contact with the part $49b_2$. Further, the lever 49 is normally urged in the clockwise direction by means of the tension spring 52 where one end is engaged with the lever 49 and whose other end is engaged with the pin 51 provided on the camera body 1A. 53 is a spur gear secured on the shaft 55 rotatably supported on the camera base body 1A, being normally engaged with the gear 8. 54 is a disc shaped cam member secured on the shaft 55 on which the gear 53 is secured, whereby a concave part 54a is formed at a part of the circumference of the cam member 54. 56 is a transportation motor control swing lever secured on the shaft rotatably supported on the camera base body 1A, being normally urged in the clockwise direction by means of a tension spring 59 having one end engaged with the lever 56 and the other end is engaged with a pin 58 provided on the camera body 1A. Hereby, the one end 56a of the lever 56 extends up to a position at which the end 56a is engageable with a part of the tail curtain of the shutter, while the other end 56b is normally in contact with the circumference of the cam member 54. SW2 is a normally opened switch secured on the camera base body so as to be closed by means of the urging strength of the lever 56, when the lever 56 is moved in the counterclockwise direction and opened when the lever 56 is engaged by the concave part 54a of the cam member 54 so as to be moved in the clockwise direction.

60 is the leading shutter curtain constituting a shutter device provided in the photographing optics frame body 1, while 61 is a tail shutter curtain. 62 is the shutter curtain holding plate for guiding the slide motion of the leading shutter curtain 60 and the tail shutter curtain 61, provided with the control bent parts 62a and 62b. The aforementioned leading shutter curtain 60 provides the exposure opening 60a, the engaging part engageable with the one end 49a of the aforementioned shutter charge lever 49, the switch control part 60c and the spring engaging part 60d, being normally used in the direction to the left in FIG. 2 by means of a tension spring 65 whose one end having engaged with the pin 63 provided in the photographing optics frame body 1D and the other end engaged with the pin 64 provided on the engaging part 60d of the leading shutter curtain 60. Further, the aforementioned tail shutter curtain 61 is arranged so as to overlap the aforementioned leading curtain 60, and provides the exposure opening 61a, the bent part 61d, the spring engaging part 61c, the engaging part 61d engageable with the one end 56a of the transportation motor control lever 56 and the switch control part 61e, being normally urged in the direction to the left in FIG. 2 by means of the tension spring 66 having one end is engaged with the pin 65 provided on the photographing optics frame body 1D and the other end engaged with the pin 67 provided on the engaging part 61c of the tail curtain 61. 68 is the pin provided on the tail curtain and is so designed that the tail shutter curtain 61 as well as the leading shutter curtain 60 are brought back together when the leading shutter curtain 60 is brought back in the direction to the right in FIG. 2 by means of the shutter charge lever 49. 69 is the holding swing lever rotatably supported on the photographing optics frame body 1D. At one end of the holding lever 69, a holding claw part 69a which is engageable with the stopper pin 71 provided on the leading shutter curtain 60, so as to hold the leading shutter curtain 60 and the tail shutter curtain 61 in the state in which the springs 63 and 66 are tensioned is provided, while the other end 69b extends into the camera base body 1A. 72 is the stopper pin provided on the photographing optics frame body 1D so as to control the amount of the rotation of the holding lever 69 in the counterclockwise direction. Hereby, the holding lever 69 is normally urged in the counterclockwise direction by means of the tension spring 76 having one end engaged with the pin 77 provided on the photographing optics frame body 1D and another end engaged with the pin provided on the holding lever 69. 73 is the lever rotatably supported on the holding lever 69 by means of the pin 74 provided on the holding lever 69, whereby one end of the lever 73 is provided with an engagement claw 73a engaged with the pin 75 provided on the holding lever 69 while the other end is engaged with one end of the tension spring 78 whose other end is engaged with the pin 79 provided at the end 69b of the holding lever 69 so as to normally urge the lever 73 in the clockwise direction. 80 is the trigger member slidably held by means of the camera base body 1A, whereby at one end of the trigger member 80 the trigger button 1F projecting out of the camera body is secured. The trigger member 80 is provided with the pin 82 for controlling the levers 69 and 73 and the pin 83 for engaging the spring. The pin 83 of the aforementioned trigger member 80 is engaged with one end of the tension spring 84 whose other end is engaged with the camera base body 1A so as to normally urge the trigger member 80 in such a manner that the trigger button 1F moves in the direction along which the button 1F projects out of the camera body. The pin 82 of the trigger member 80 is arranged at the position at which the pin 82 is in contact with the lever 73 so as to rotate the lever 73 in the clockwise direction, when the trigger button 1F is pushed into the camera body 1.

$Mg_1$ is the magnet for holding the tail shutter curtain 61 at a position (shown in FIG. 2) at which the spring 66 is kept tensioned for a certain time after the trigger button 1F is operated so as to disengage the pin 71 on the leading shutter curtain 60 from the engaging claw part 69a of the holding lever 69, so that the leading shutter curtain 60 starts to run.

Hereby, the leading shutter curtain 60 and the tail shutter curtain 61 are so designed that the tail shutter curtain 61 starts to run after a certain determined time after the leading shutter curtain 60 has started to run. Hereby, in the state in which only the leading shutter curtain 60 has run until the curtain 60 is in contact with the control bent part 62b of the holding plate 62, the opening 60a of the leading shutter curtain 60 overlaps the opening 61a of the tail shutter curtain 61, so as to expose the sensitive plane of the sheet shaped sensitive material 42. In the state in which the tail shutter curtain 61 has run until the curtain 61 is in contact with the control bent part 62b of the holding plate 62, the opening 60a of the leading shutter curtain 60 does not overlap the opening 61b of the tail shutter curtain 61 so as to prevent any further light from reaching the sensitive plane of the sheet shaped sensitive material 42. SW1 is the normally opened switch, being fixed on the aforementioned photographing optics frame body 1D at the position at which the switch SW1 is controlled by means of the switch control part 60c of the leading shutter curtain in such a manner that the switch SW1 is closed by means of the switch control part 60c of the leading shutter curtain 60 when the leading shutter curtain 60 is charged as is shown in FIG. 2 and opened when the leading shutter curtain 60 has run. SW4 is the normally opened switch, being fixed on the afore mentioned photographing optics frame body 1D at the position at which the switch SW4 is controlled by means of the switch control part 60c of the leading shutter curtain 60 in such a manner that the switch SW4 is closed by means of the switch control part 60c of the leading curtain 60, when the leading shutter curtain 60 has completely run and opened when the leading shutter curtain 60 is charged. SW5 is the normally opened switch, being fixed on the aforementioned photographing optics frame body 1D at the position at which the switch SW5 is controlled by means of the switch control part 61e of the aforementioned tail shutter curtain 61 in such a manner that the switch SW5 is closed by means of the switch control part 61e of the tail shutter curtain 61 when the tail shutter curtain 61 is charged as is shown in FIG. 2 and opened when the tail shutter curtain 61 has run.

The circuits for electrically controlling the photographing camera in accordance with the present invention shown in FIGS. 1 and 2 are shown in detail in FIGS. 3 and 4. FIG. 3 shows the current supply control circuit for controlling the current supply to the flash light photographing device 1K and the film winding up motor for the photographing camera shown in FIGS. 1 and 2, while FIG. 4 shows the parts shown in block diagram form in the current supply control circuit shown in FIG. 3 together with the circuit for electrically controlling various mechanisms of the photographing camera.

The members with same figures in FIG. 3 and FIG. 4 are the same members while the members with same figures in FIG. 1 and FIG. 2 are the same members.

202 is a one shot circuit having an input terminal I and output terminals Q, $\overline{Q}$. As shown in FIG. 4 one shot circuit 202 consists, of a differentiating circuit utilizing a conventional resistance R5, a diode D3, a condenser C1 and a monostable multivibrator utilizing resistances R6–R10, diodes D1, D1′, a condenser C2 and transistors Tr2 and Tr3. Switch SW2 which is closed when the tail shutter plane 61 has run and opened when the shutter is charged is connected in series with the input terminal I of the one shot circuit 202. 203 is an amplifier whose input terminal is connected to the output terminal Q of the aforementioned one shot circuit 202 and consists of resistances R11, R12 and R13 and transistors Tr4 and Tr5. The resistance R11 is connected between the output terminal Q of the one shot circuit 202 and the base of the transistor Tr4, while the resistance R12 is connected between the base and the emitter of the transistor Tr4. Further the collector of the transistor Tr4 and that of the transistor Tr5 are connected to the aforementioned motor 13. 210 is an OR gate having two input terminals, whereby one input terminal is connected to the output terminal $\bar{Q}$ of the aforementioned one shot circuit 202 while the other input terminal is connected to the output of the comparator 209. The resistances R1 and R2 are for dividing the power source voltage, whereby the resistance R3 and the Zener diode ZD are for obtaining a standard voltage. Hereby, the connecting point of the resistance R1 to the resistance R2 is connected to the positive input terminal of the comparator, while the connecting point of the resistance R3 to the Zener diode ZD is connected to the negative input terminal of the comparator. The resistances R1, R2, R3, the Zener diode ZD and the comparator 209 constitute the power source voltage detecting circuit 201. 211 is a NAND gate having two input terminals and one output terminal, whereby one input terminal is connected to the output terminal of the OR gate circuit 210 while the other input terminal is connected to the positive terminal (+E) of the power source through the switch SW6. Tr1 is a transistor, whose emitter circuit is connected in series with the power source 100 through the main switch $SW_M$, whose base circuit is connected in series with the output terminal of the NAND gate circuit through the resistance R4 and whose collector circuit is connected to the charge control circuit 215 of the flash light device 1K.

101 is a photo voltaic element such as a silicone photo diode. 102 is a high input impedance operational amplifier, 103 a time integrating condenser connected between the input terminal and the output terminal of the amplifier 102, 104 a bias level setting voltage source and SW1 the time count starting switch shown in FIG. 2, which is opened when the leading shutter curtain 60 starts to run. 105 is a Schmidt trigger circuit for controlling the current supply to the magnet Mg1 shown in FIG. 2. The circuit 105 is inverted, when the output voltage of the operational amplifier 102 becomes higher than the trigger level of the Schmidt trigger circuit 105 following the charging start of the condenser 103 after the closing of the switch SW1, so as to interrupt the current supply to the aforementioned magnet Mg1. Hereby, the photo voltaic element 101, the operational amplifier 102, the condenser 103, the bias level setting voltage source 104, the Schmidt trigger circuit 105, the switch SW1 and the magnet Mg1 constitute the light measuring time control circuit device 200, which is intended to automatically set the time between the start of the leading shutter curtain 60 and that of the tail shutter curtain 61, namely the time during which the opening 60a of the leading shutter curtain 60 overlaps the opening 61a of the tail shutter curtain 61 so as to expose the sheet shaped sensitive material, in accordance with the brightness of the object to be photographed, which is a well known construction for the electrical shutter device for a camera.

The aforementioned charge control circuit 215 utilizes a high voltage source device 215a consisting of a primary coil CL1, a secondary coil CL2, a third coil CL3, a resistance R14, a transistor Tr6 and a condenser C3 and a diode D2, a main condenser C4, a trigger condenser C5, a flash light tube 108, a trigger coil 109, a resistance R15 and switches SW4 and SW5, connected in a well known configuration.

Below the operation of the first embodiment of the photographing camera constituted as above in accordance with the present invention will be explained in detail.

At first judging from the scene and the brightness of the object to be photographed the photographer decides whether the object has to be photographed under daylight or flash light and operates the photographing mode change over dial 1H, setting the finger $1H_1$ of the dial 1H at the mark "S" or "D" on the index plate 1J.

Hereby, when the finger $1H_1$ of the photographing change over dial 1H has been set at the mark "D" on the plate 1J, the switch SW6 is in the open state in such a manner that even if the main switch $SW_M$ is closed the transistor Tr1 is in the open state so that no current runs through the charge control circuit 215.

Thus, the state in which the finger $1H_1$ of the photographing mode change over dial 1H has been set at the mark "D" of the plate 1J will be at first explained. In the state in which the trigger button 1F is not operated and the shutter remains charged, the switch SW1 is closed while the switch SW2 is opened. When the main switch $SW_M$ is closed in this state, the switch SW1 is brought into the closed state, so that the Schmidt trigger circuit 105 allows current to run through the magnet Mg1, while when the trigger button 1F is operated in this state the lever 73 is pushed by means of the pin 82 on the trigger member 80. Hereby, the force working upon the lever 73 is transmitted to the lever 69 through the pins 74 and 75 so as to rotate the lever 69 around the pin 70 in the clockwise direction. By means of this rotation of the lever 69 the pin 71 on the leading shutter curtain 60 is disengaged from the engaging claw part 69a. Along with this disengagement, the leading shutter curtain 60 runs by means of the biassing force of the spring 65 until the curtain 60 comes in contact with the control bent part 62b of the holding plate 62 so as to close the switch SW4. Along with the start of the leading shutter curtain 60 the switch SW1 is opened, whereby the condenser 103 is charged with the photo current produced in the photo transducing element in accordance with the brightness of the object to be photographed, so as to start the count by the light measurement time control circuit device 200. When the switch SW1 is opened, the condenser 103 of the shutter time control circuit device 200 is charged until the output voltage of the operational amplifier 102 reaches the trigger level of the Schmidt trigger circuit 105, whereupon the Schmidt trigger circuit 105 is inverted so as to interrupt the current supply to the magnet $Mg_1$. Along with the interruption of the current supply to the magnet $Mg_1$ the attracting force of the magnet $Mg_1$ terminates so as to release the tail shutter curtain 61 held until then by means of the attracting force of the magnet $Mg_1$, so that the tail shutter curtain 61 runs by means of the biassing force of the spring 66 until the curtain 61 comes in contact with the control bent part 62b of the holding plate 62 so as to bring the switch SW5 into the closed state by means of the switch control part 61e of the tail shutter curtain 61. Immediately before the tail shutter curtain 61 has come in contact with the control bent part 62b of the holding plate 62 the engaging part 61d of the tail shutter curtain 61 works upon the lever 56 so as to rotate the lever 56 around the pin 57 in the clockwise direction. Along with the start of the tail shutter curtain 61, the switch SW5 is opened while the alignment of the opening 60a of the leading shutter curtain 60 with the opening 61a of the tail shutter curtain 61 does not exists any more so as to terminate the exposure to the sheet shaped sensitive material 42. When the engaging part 61d of the tail shutter curtain 61 works upon the lever 56 after the tail shutter curtain 61 has run, the lever 56 is rotated against the urging force of the spring 59 in the counterclockwise direction until one end 56b of the lever 56 brings the switch SW2 into the closed state. Along with the closing of the switch SW2, the output terminal Q of the one shot circuit 202 delivers the high level output "1" during the time determined by the time constant of the resistance R7 and the condenser C2. As long as the output at the output terminal Q of the one shot circuit 202 is "1", the transistors Tr4 and Tr5 of the amplifier 3 are in the switched on state, so as to drive the motor 13, while when the output at the output terminal Q of the one shot circuit 202 becomes "0" the transistors Tr4 and Tr5 of the amplifier 3 are in the switched off state so as to stop the motor 13. The time constant of the resistance R7 and the condenser C2 is determined in such a manner that the output of the output terminal Q of the one shot circuit 202 remains "1" until the determined film winding up by means of the motor 13 has been completed.

The rotation of the motor 13 which is started by means of the operation of the one shot circuit 202 and the amplifier 3 is transmitted to the rotation shaft 5 through the gears 14, 12, 11 and 9, and further to the rotation shaft 4 through the one way clutch 7, so as to rotate the gear 8. When the gear 8 is rotated in this way, the gear 53 is rotated with the gear 8, whereby the cam member 54 is rotated as one body with the gear 54, while at the same time the gear 19 engaged with the gear 8 is rotated. The rotation of the gear 19 is transmitted to the gear 31 through the gears 21, 30, 32$_1$, 32$_2$, 35 and 36. The rotation of the gear 31 is transmitted to the rollers 38 and 39 while the gear 21 is transmitted to the disc 22, whose long pin 22a works upon the engaging part 43c of the base plate 43, so as to move the base plate to the right in FIG. 2. When the base plate 43 is moved, the recently exposed sheet shaped sensitive material 42 is discharged out of the sensitive material discharging opening 41a by means of the transportation effect of the plate spring 46 secured on the base plate until the front end is clamped between the rolls 38 and 39. When the front end of the sheet shaped sensitive material 42 is clamped between the rolls 38 and 39, the sensitive material 42 is discharged out of the sensitive material discharging opening 1C$_1$ only by the rotation of the rolls 38 and 39, whereby the developing processing solution container contained in the sheet shaped sensitive material 42 is broken between the rolls 38 and 39, and is distributed over the sensitive material the processing solution coming out of the solution container in order to carry out the self development process. Further, the gear 19 is rotated along with the rotation of the gear, the shutter charge lever 49 is rotated around the pin 50 in the clockwise direction by means of the pin 19a on the gear 19 so as to charge the leading shutter curtain 60 and the tail shutter curtain 61. Namely, when the shutter charge lever 49 is rotated along the clockwise direction by means of the pin 19a of the gear 19, the one end 49 of the lever 49 is engaged with the engaging part 60b of the leading shutter curtain 60 so as to move the leading shutter curtain 60 to the right in FIG. 2 against the strength of the spring 65. Because the leading shutter curtain 60 remains in engagement with the pin 68 on the tail shutter curtain 61, when the leading shutter curtain 60 is moved to the right, the leading shutter curtain 60 as well as the tail shutter curtain 61 are moved to the right in FIG. 2 against the strength of the springs 65 and 66 until the pin 71 on the leading shutter curtain 60 is engaged with the engaging claw 69a of the holding lever 69 so as to complete the shutter charge.

The time constant of the resistance R7 and the condenser C2 of the one shot circuit 202 is chosen in such a manner that the output at the output terminal Q of the one shot circuit 202 is kept at "1" until the tail shutter curtain 61 has run and the motor 13 starts to run until the shutter has been charged so that as soon as the shutter has been charged the output at the output terminal Q of the one shot circuit 202 becomes "0" again, whereby the motor 13 stops so as to complete one cycle of the daylight photography. Then the switch SW1 is again closed, the switch SW2 opened, the switch SW4 opened and the switch SW5 closed.

Below the flash light photography, namely the case wherein the finger 1H$_1$ of the photographing mode change over dial 1H has been set at the mark "S" of the plate 1J, while the switch SW6 has been closed will be explained, whereby the operation in case of the flash light photography will be explained in accordance with the timing chart shown in FIG. 5.

When the main switch SW$_M$ is closed while the switch SW6 remains in the closed state, the output at the output terminal $\overline{Q}$ of the one shot circuit 202, the output at the point A and that at the point B become altogether a high level output "1", while the output at the point C becomes a low level output "0" so that the transistor Tr1 is brought in the switched on state so as to charge the main condenser C4 and the trigger condenser C5 through the high voltage source device. When the trigger button 1F is operated after the charge control circuit 215 of the flash light device 1K has been charged in this way, the leading shutter curtain 60 starts to run. When the leading shutter curtain 60 has run the switch SW4 is closed in such a manner that the flash light emitting discharge tube 108 operates. After that the tail shutter curtain 61 runs in the same way as above, and the switch SW2 is closed. The operation of the voltage judging circuit 201 in this case is as follows.

(a) The case when the voltage (+E) of the power source 100 is sufficiently high (FIG. 11 (a))

When the switch SW2 is closed along with the start of the tail shutter curtain 61, the output at the output terminal Q of the one shot circuit 202 rises up at the time t1 at which the switch SW2 is closed, remains "1" during the time determined by the time constant of the resistance R7 and the condenser C2 from t1 up to t2 and falls down from "1" to "0" at t2.

The output at the output terminal $\overline{Q}$ of the one shot circuit 202 remains "0" from t1 to t2 and rises up from "0" up to "1" at t2. While the output at the output terminal Q of the one shot circuit 202 remains "1", the motor 13 is driven, whereby when the power source 100 remains active and its internal resistance is low enough, the voltage divided by the voltage dividing circuit R1 and R2 is higher than the constant voltage given by the standard voltage circuit R3 and the Zener diode ZD even while the motor 13 is driven, so that the output point A of the comparator 209 produces the output "1". Consequently, the output point B of the OR gate circuit 10 produces the output "1" regardless of the output at the output terminal $\overline{Q}$ of the one shot circuit 202. Hereby the switch SW6 is in the closed state by means of the previous operation of the photographing mode change over dial 1H so that the output point C of the NAND gate 211 always delivers the output "0", which is input in the transistor Tr1 through the series resistance R4 so as to bring the transistor Tr1 in conductive state in such a manner that the charge control circuit 215 of the flash light device 1K connected to the output of the transistor Tr1 begins to charge the flash light device. Namely, when the power source 100 has a sufficiently high voltage, the current is supplied in parallel to the motor 13 and the charge control circuit 215 in such a manner that the motor 13 is driven while at the same time the charge control circuit 215 is charged.

(b) The case where the power source 100 has a voltage (+E) lower than the standard voltage (FIG. 11 (b))

When the voltage divided by the dividing resistances R1 and R2 becomes lower than the standard voltage determined by the standard voltage circuit R3 and the Zener diode ZD the motor 13 is driven in the same way as above after the switch SW2 has been closed along with the completion of the running of the aforementioned tail shutter curtain 61, and the output point A of the comparator 9 delivers the output "0". Because the output terminal $\bar{Q}$ of the one shot circuit 202 delivers the output "0" from t1 to t2, the output point B of the OR gate circuit 210 delivers "0" from t1 to t2. Further, because the switch SW6 is in the closed state, the output at the output point C of the NAND gate circuit 211 is an inverted version the output point B of the OR gate circuit 210, being "1" from t1 to t2 as is shown in the drawing. Consequently, the transistor Tr1 is non conductive from t1 to t2, namely the time during which the motor 13 is driven, so that no current is supplied to the charge control circuit 215 of the flash light device. Namely, the capacitor of the flash light device 1K is not charged during the time during which the motor 13 is driven, in other words, the sheet shaped sensitive material 42 is transported and the shutter has been charged by means of the motor 13. The capacitor starts to be charged only after the sheet shaped sensitive material 42 is transported and the shutter has been charged by means of the motor 13. Namely, when the voltage of the power source is lower than the standard value in case the automatic winding up device (including the means for transporting the afore mentioned sheet shaped exposed sensitive material 42 as well as for automatically charging the shutter) and the flash light device operatively engaged with the automatic winding up device are operated continuously, the supply of current to the motor circuit and to the charge control circuit 215 is carried out alternately in order to avoid a large load on the power source.

Figure 6:
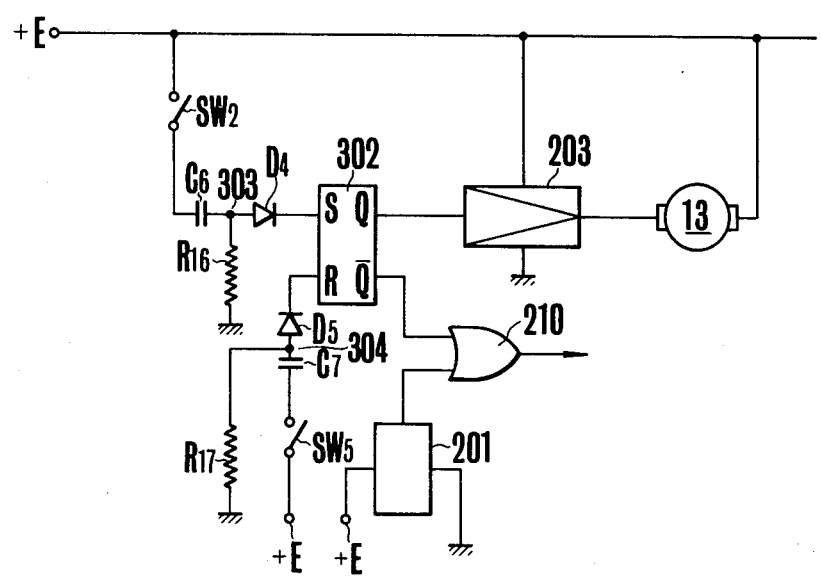
FIG. 6 shows the second embodiment of the electrical circuit shown in FIG. 3, whereby a part of the circuit is altered.

FIG. 6 shows the second embodiment in accordance with the present invertment, whereby a part of the electrical circuit shown in FIG. 3 is modified. Hereby, the one shot circuit 202 in the embodiment shown in FIG. 3 is replaced by an R-S type flip-flop circuit 302, whereby the elements with same numbers in FIG. 3 are the same elements. The condenser C6, the resistance R16 and the diode D4 constitute the differentiating circuit 303 to be connected to the set input terminal S of the flip-flop circuit 302, while the condenser C7, the resistance R17 and the diode D5 constitute the differentiating circuit 304 to be connected to the reset input terminal R of the flip-flop circuit 302.

Figure 7:
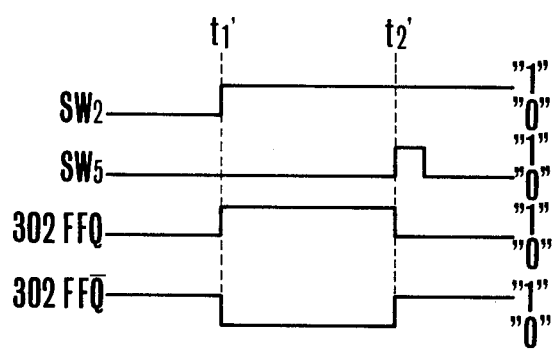
FIG. 7 shows the timing chart of the electrical circuit shown in FIG. 6.

FIG. 7 shows the timing chart for the circuit shown in FIG. 3. Below the operation of the circuit of the second embodiment shown in FIG. 3 will be explained in accordance with the timing chart shown in FIG. 7.

In the same way as in case of the embodiment shown in FIGS. 1 to 4, the second embodiment is designed in such a manner that when the switch SW2 is closed after the tail shutter curtain 61 has run, the differentiating circuit 303 produces a pulse signal so as to set the flip-flop circuit whose output terminal Q delivers the output "1". The output is amplified by means of the amplifier 203 so as to drive the motor, whereby the sheet shaped sensitive material 42 is transported while the shutter is charged. When the switch SW5 is closed after the shutter is charged, a reset pulse is input in the flip-flop circuit 302 through the differentiating circuit 304 so as to reset the circuit 302 whose output terminal $\bar{Q}$ delivers the output "1". Thus, the output at the output terminal $\bar{Q}$ of the flip-flop circuit 302 and that of the power source voltage detecting circuit 201 are input to the OR gate circuit 210, by means of whose output the current supply to the charge control circuit 215 of the flash light device 1K is controlled through the NAND gate 211 and the transistor Tr1.

Namely also in case of the second embodiment in accordance with the present invention shown in FIG. 6, when the voltage of the power source 100 is sufficiently high the motor 13 is driven in parallel with the current supply to the charge control circuit 215 in the same way as in case of the first embodiment, while if the voltage of the power source 100 is lower than a certain determined value the current supply to the aforementioned charge control circuit 215, namely the charge of the flash light device 1K is started after the motor has stopped.

Namely, in case of the first and the second embodiments of the photographing camera device shown in FIGS. 1 to 7, the current supply to the motor 13 and the flash device 1K is automatically changed over from the parallel system to the series system in accordance with the consumption of the power source so that the flash light device 1K is used under different conditions in accordance with the state of the power source.

FIGS. 8 to 11 show the third embodiment of the photographing device in accordance with the present invention. The third embodiment relates to a photographing camera device in which the current is supplied to the flash light device and the sensitive material from a single power source, being provided with a switch means by means of which in case of the flash light photography, the current supply to the aforementioned motor is started by means of a manual operation only after having taken a picture under flash light, while the current is supplied to the aforementioned flash light device as well as a safety device by means of which the aforementioned motor is always driven at a certain determined speed in order to avoid a large load on the power source when the sensitive material feed motor is driven while the trigger device of the photographing camera device is locked, so as to prevent taking a picture until the flash light device has been charged during flash light photography. Further, in FIG. 8, the members that are the same as the members shown in FIG. 2 are labeled with the same numbers. The difference between the mechanism shown in FIG. 8 and that shown in FIG. 2 is that the mechanism shown in FIG. 8 further includes the detecting lever 2, the magnet Mg2, the pin 81 and the switch SW3. Hereby, the detecting lever 2 is rotatably supported by means of the pin 3 provided on the camera base body 1A, provided with a bent part 2a and the engaging part 2b. Hereby, the detecting lever 2 is normally urged by means of a tension spring 5 having one end engaged with the detecting lever 2 and whose other end is engaged with the camera base body 1A. Further, the aforementioned magnet Mg2 is secured on the camera base body at the position facing to the bent part 2a of the detecting lever 2. The operation of the detecting lever 2 and that of the magnet Mg2 are as follows. Namely, when the magnet Mg2 is in the non-excited state, the detecting lever 2 has been rotated by means of the strength of the spring 6 in the counter clockwise direction in such a manner that the engaging part 2b is arranged in the slide range of the trigger member 80. In this state, even if the trigger button 1F is operated, it is brought in contact with the engaging part 2b of the detecting lever 2 of the trigger member 80 in such a manner that the trigger operation does not take place, while once the magnet Mg2 is excited the engaging part of the detecting lever 2 is attracted by means of the magnet Mg2 in such a manner that the detecting lever 2 is rotated against the biassing force of the spring 6 in the clockwise direction, whereby the engaging part 2b of the detecting lever 2 is withdrawn from the slide range of the trigger member 80 in such a manner that the trigger member 80 moves up to the operation position in response to the operation of the trigger button 1F. Further, the pin 81 provided on the aforementioned trigger member 80 is arranged so as to close the switch SW3 when the trigger button 1F is pushed toward the inside of the camera body.

Figure 9:
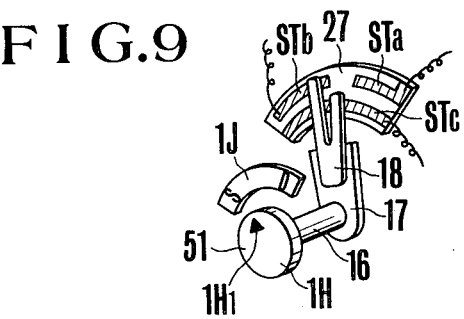
FIG. 9 shows a photographing mode change over means in detail in perspective view.

FIG. 9 is the detailed perspective view of the change-over means between the flash light photographic mode and the daylight photographic mode.

The photographic mode change-over dial 1H and the index plate 1J in FIG. 9 are the same members shown in FIG. 1. 16 is the rotary shaft rotatably supported on the camera body 1A, whereby on one end of the rotary shaft 16, the dial 1H is secured while on the other end the contact support plate 17 consisting of insulating material is secured. 18 is the conductive contact piece secured on the contact support plate 17. 27 is a printed circuit plate secured on the camera base body 1A opposite the contact piece 18. On the surface of plate 27 over which the contact piece 18 is slidable the conductive pieces STa, STb and STc are formed. The thus composed change-over means is designed in such a manner that when the photographic mode change over dial 1H is rotated so as to set the indicator 1H₁ opposite the mark "S" on the index plate 1J, the conductive piece STa is connected to STc through the contact piece 18, while when the indicator 1H₁ is set at the mark "D" on the index plate 1J the conductive piece STb is connected to STc through the contact piece 18.

Figure 10:
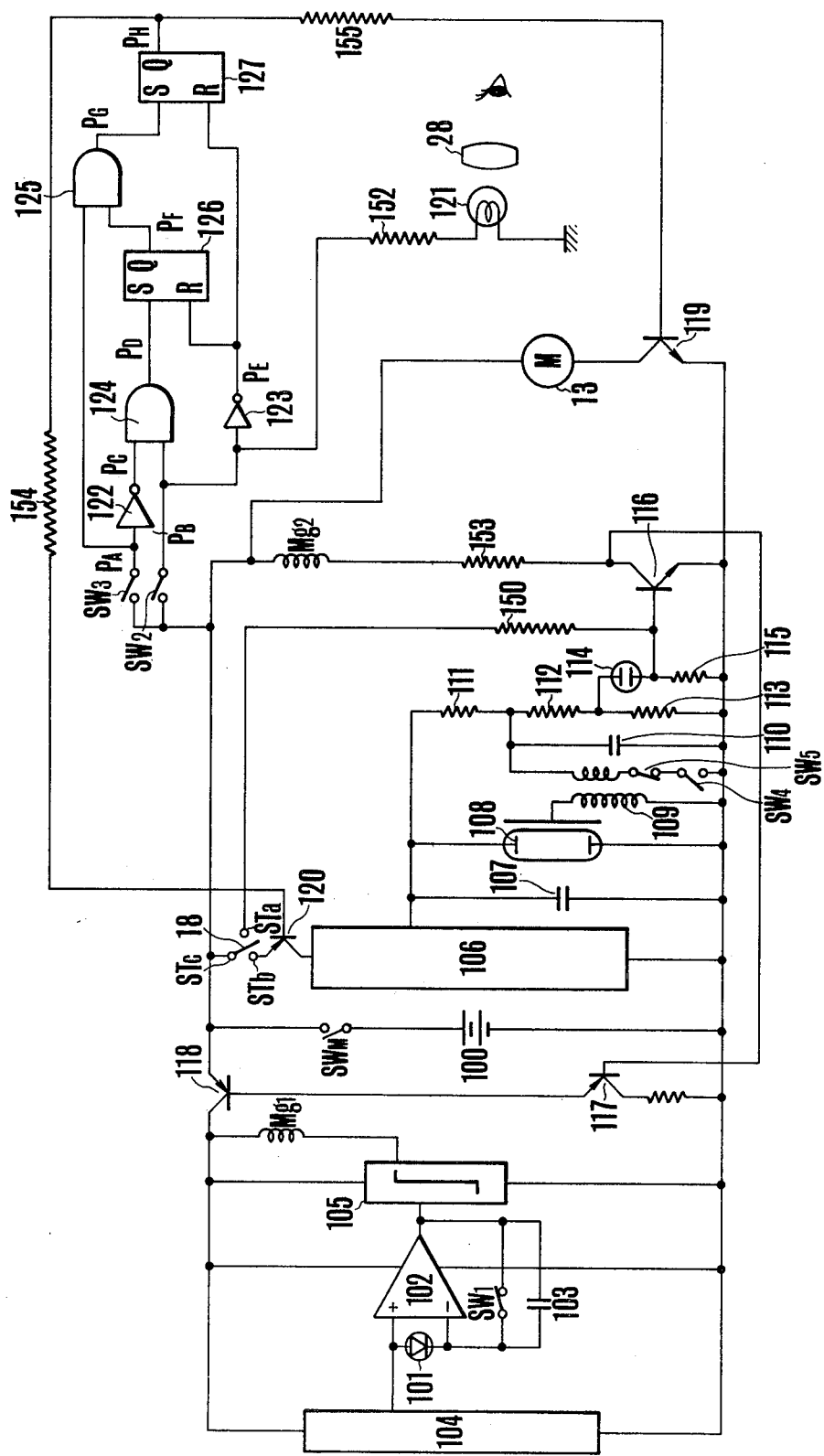
FIG. 10 shows a diagram of the circuit for controlling the photographing camera device shown in FIG. 8.

FIG. 10 shows the control circuit diagram for controlling the photographing camera device shown in FIG. 3, whereby 107 is the main condenser, 108 the flash tube, 109 the trigger coil, 110 the trigger condenser, 111, 112 and 113 the bleeder resistances, 114 the neon tube and 115 the resistance. These members constitute the flash tube control of the flash light device 1K. STa, STb and STc are the connecting terminals corresponding to the conductive pieces to be switched over by means of the photographing mode change-over dial 1H shown in FIG. 9. 116, 117 and 118 are the transistors, constituting a detecting circuit together with the magnet Mg2. The above mentioned transistor 116 is so designed as to be brought in the switched-on state so as to allow the current supply to the abovementioned magnet Mg2 if a certain amount of charge has been loaded in the trigger condenser 110 as well as the main condenser 107 in such a manner that the neon tube 114 is lit by means of the bleeder resistances 111, 112 and 113. Transistor 116 is also brought into the conductive state when the camera is in the daylight photographic mode in which the indicator 1H₁ of the photographing mode change over dial 1H corresponds to the mark "S" on the index plate 1J and the contact piece 18 is connected to the conductive pieces STc and STa. Further, the transistors 117 and 118 are so designed to conduct when the transistor 116 is switched on, whereby when these transistors 117 and 118 are conductive the power source 100 is electrically connected to the aforementioned light measuring time control circuit device (101-105, SW1, Mg1). 119 is the switching transistor for controlling the drive of the motor 13 having a collector circuit connected in series with the motor 13. 120 is the switching transistor for controlling the current supply to the flash light device 1K. The operation of the transistor 119 is opposite that of the transistor 120 in such a manner that the transistor 119 conducts when the transistor 120 is non-conductive. This occurs when the flip-flop circuit 127 to be explained later, produces the output "1". The transistor 119 stops conducting and the transistor 120 conducts when the circuit 127 produces the output "0", 151, 152, 153, 154 and 155 are the resistances.

122 and 123 are the inverter circuits, 124 and 125 the AND circuits and 126 and 127 the flip-flop circuits, whereby these circuits constitute the logic circuit for controlling the current supply to the motor 13 and the flash light device 1K. 121 is the lamp provided in front of the eye piece lens in the view finder, being lit as long as the switch SW2 is closed. Because the lamp 121 is lit by means of the switch SW2 to be opened when the tail shutter curtain 61 has run the photographer can see when the exposure is finished, while because the switch SW2 remains closed so as to drive the motor 13 until the exposed sheet shaped sensitive material 43 has been brought out of the camera, being self developed by means of the rolls 38 and 39, the lamp remains lit during that period and the photographer can see that the process has not being yet finished.

FIG. 11(a) shows the timing chart of the third embodiment of the photographing camera composed as mentioned above in accordance with the present invention. The operation of the embodiments shown in FIGS. 1 to 8 and that of the control circuit shown in FIG. 10 will be explained in accordance with the timing chart shown in FIG. 11(a). Hereby, FIG. 11(a)-1 relates to the flash light photography while FIG. 11(a)-2 relates to the daylight photography.

The contact piece 18 is connected between the conductive pieces STc and STb so as to enable the flash light photography when the photographer sets the indicator 1H₁ of the photographing mode change-over dial 1H at the mark "S" on the index plate. Conductive piece 18 is connected between the conductive pieces STc and STa so as to enable the daylight photography, locking the flash light device 1K when the indicator 1H₁ is set at the mark "D".

At first, the case of the daylight photography in which the contact piece 18 is connected between the conductive pieces STc and STa will be explained in accordance with FIG. 11(a)-2. When the main switch SW$_M$ is closed in the state in which the pin 71 on the leading shutter curtain 60 is engaged with the engaging claw part 69a of the lever 69 while the trigger button 1F is pushed down, the transistors 116, 117 and 118 conduct, so as to electrically connect the light measuring control circuit device to the power source 100. Before the trigger button 1F has been operated the switch SW1 is in the closed state so that the condenser 103 is not charged, so as to allow current to be supplied to the magnet Mg1 through the Schmidt trigger circuit 105. Further, when the transistor 116 conducts, the magnet Mg2 is brought into the excited state so as to attract the bent part 2a of the detecting lever 2, so that the detecting lever 2 is rotated around the pin 30 in the clockwise direction against the urging force of the spring 6 in such a manner that the engaging part 2b is withdrawn out of the slide range of the trigger member 80 so that the trigger member 80 is operable. When the trigger button 1F is not operated, the motor 13 is in the non driven state, because the switch SW3 is in the closed state while the switch SW2 is in the opened state in such a manner that the signal level at the point PA of the logic circuit is 1, the signal level at the point PB is 0, the signal level at the point PC is 0, the signal level at the point PD is 0, the signal level at the point PE is 0, the signal level at the point PF is 0, the signal level at PG is 0 and the signal level at PH is 0, so that the transistor 119 is not conducting. Further, the lamp 121 is also in the unlit state while the switch SW2 is in the opened state.

When in the above mentioned state, the trigger button 1F is operated, the switch SW3 is brought in the opened state by means of the pin on the trigger member 80, while the lever 73 is pushed by means of the pin 82 on the trigger member 80. The force of the pin 82 on the trigger member 80 working upon the lever 73 is transmitted to the lever 69 through the pins 74 and 75, so as to rotate the lever 69 around the pin 70 in the clockwise direction in such a manner that the pin 71 on the leading shutter curtain 60 is disengaged from the engaging part 69a. When the pin 71 on the leading shutter curtain 60 is disengaged from the engaging claw part 69a the leading shutter curtain 60 runs by means of the tension in the spring 65 until the leading shutter curtain 60 is in contact with the control bent part 62b of the holding plate 62, so as to close the switch SW4, whereby the magnet Mg1 remains in the excited state so that the tail shutter curtain 61 remains held by means of the magnet Mg1. The leading shutter curtain 60 starts to run, opening the switch SW1 in such a manner that the condenser 103 is charged with the photo current produced in the photo transducing element 101 in accordance with the brightness of the object to be photographed, whereby the light measuring time control circuit device start the counting. When although the release button 1F is pressed, the release button 1F does not operate due to a low battery condition the switch SW3 is in the opened state, whereby the switch SW2 remains in the opened state in such a manner that the signal level at the point PA of the logic circuit is "0", the signal level at the point PB is "0", the signal level at the point PC is "1", the signal level at the point PD is "0", the signal level at the point PE is "1", the signal level at the point PF is "0", the signal level at the point PG is "0" and the signal level at the PH point is "0", while the transistor 119 is nonconductive so that the motor 13 is in the undriven state. Further, when the leading shutter curtain 60 has run the aforementioned switch SW4 is closed, whereby the switch SW4 does not work upon the running of the camera at all because the flash light device is in the inoperative state. When the switch SW1 is opened the condenser 103 of the shutter time control circuit device starts to be charged until the output voltage of the operational circuit 102 reaches the trigger level of the Schmidt trigger circuit 105, whereby the Schmidt trigger circuit 105 is inversed so as to interrupt the current supply to the magnet Mg1. When the current supply to the magnet Mg1 is interrupted, the attracting strength of the magnet Mg1 does not exist any more so as to free the tail shutter curtain held by means of the magnet Mg1 in such a manner that the tail shutter curtain 61 runs by means of the urging force of the spring 66 until the curtain 66 comes in contact with the control bent 62b of the holding plate 62 so as to bring the switch SW5 in the closed state by means of the switch control 61e of the tail shutter curtain 61, whole immediately before the tail shutter curtain 61 comes in contact with the control bent part 62b of the holding plate 62 the engaging part 61d of the tail shutter curtain 61 works upon the lever 56 so as to rotate the lever 56 around the pin 57 along the counter clockwise direction when the tail shutter curtain 61 runs the switch SW5 is opened, while the alignment of the opening 60a of the leading shutter curtain 60 with the opening 61a of the tail shutter curtain 61 is not kept any more so as to terminate the exposure to the sheet shaped tail shutter curtain 61. When the tail shutter curtain 61 has run the engaging part 61d of the tail shutter curtain 61 works upon the lever 56 so as to rotate the lever 56 along the clockwise direction, in such a manner that the one end 56b of the lever 56 is brought out of the concave part of the cam member 54 so as to bring the switch in the opened state. When the switch SW2 is closed while the trigger button 1F is being operated, the switch SW3 remains in the opened state, the signal level at the point PA of the logic circuit is "0", the signal level at the point PB is "1", the signal level at the point PC is "1", the signal level at the point PD is "1", the signal level at the point PE is "0", the signal level at the point PF is "1", the signal level at the point PG is "0" and the signal level at the point PH is "0", so that the motor 13 is not driven. When the switch SW2 is closed, the lamp 121 is lit, whereby the photographer can see in the view finder that the tail shutter curtain 61 has run. When the photographer, who has observed that the lamp 121 is lit, releases the operation of the trigger button 1F, the signal level at the point PA of the logic circuit is "1", while the signal level at the point PF is kept "1", so that the signal level at the point PG is "1", while the signal level at the point PH is "1" in such a manner that the transistor 119 conducts so as to start the motor 13. When the motor 13 rotates, the rotation of the motor 13 is transferred to the rotation shaft 5 through the gears 14, 12, 11 and 9, and further to the rotation shaft 4 through the one way clutch 7 so as to rotate the gear 8. When the gear 8 is rotated in this way, the gear 53 is also rotated in such a manner that the cam member 54 integral with the gear 53 is also rotated while the gear 19 engaged with the gear 8 is rotated. The rotation of the gear 19 is further transferred to the gear 31 through the gears 21, 30, 32$_1$, 32$_2$, 35 and 36. The rotation of the gear 31 is further transferred to the disc 22, whereby the long pin 22a on the disc 22 works upon the engagement part 43c of the base plate 43 so as to move the base plate 43 to the right in FIG. 2. When this base plate 43 moves, the first, just exposed sheet shaped sensitive material 42 on the cartridge engaged with the friction member 47 of the plate spring 46 is transported by means of the plate spring 46 secured on the base plate 43 out of the sensitive material discharging opening 41a until the front end is clamped between the rolls 38 and 39. When the front end of the sheet shaped sensitive material 42 is clamped between the rolls 38 and 39, only by means of the rotation of the rolls 38 and 39, the sheet shaped sensitive material 42 is discharged out of the sensitive material discharging opening 1C₁, whereby the developing processing solution container in the sheet shaped sensitive material 42 is broken between the rolls 38 and 39 so as to spread the solution coming out of the container over the sensitive material and carry out the self developing process. Further, when the gear 19 is rotated along with the rotation of the gear 8, by means of the pin 19a on the gear 19 the shutter charge lever 49 is rotated around the pin 50 in the clockwise direction in order to charge the leading shutter curtain 60 and the tail shutter curtain 61. Namely, along with the rotation of the shutter charge lever 49 by means of the pin 19a on the gear 19 in the clockwise direction, the one end of the lever 49 is engaged with the engaging part 60b of the leading shutter curtain 60 so as to move the leading shutter curtain 60 against the brassing force of the spring 65 to the right in FIG. 8. Because the leading shutter curtain 60 is engaged with the pin 68 on the rear shutter curtain 61, when the leading shutter curtain is moved to the right the leading shutter curtain 60 and the tail shutter curtain 61 are moved against the brassing force of the springs 65 and 66 to the right in FIG. 8 until the pin 71 on the leading shutter curtain 60 is engaged with the engaging claw 69a of the engaging lever 69 so as to complete the shutter charge.

On the other hand, when along with the rotation of the gear 8, the gear 53 is rotated in such a manner that the cam member 54 integral with the gear 53 starts to rotate, the lever 56 is rotated in the clockwise direction until the other end 56b of the lever 56 is in contact with the part having a large diameter of the cam part 54 while the concave part 54a of the cam member 54 is in contact with the other end 56b of the lever 56, whereby the switch SW2 is kept in the closed state and the lamp 121 is lit. Namely, the time during which the aforementioned cam member 54 controls the lever 56 so as to change over the switch SW2 from the closed state to the opened state is chosen to be the one during which the aforementioned shutter charge lever 49 completes the shutter charging by means of the pin 19a on the gear 19 and the sheet shaped sensitive material 42 has completely been discharged. Consequently, the lamp is lit when the tail shutter curtain 61 has run and put out when the sensitive material has been developed and transported so that the photographer can learn that the sheet shaped sensitive material 42 has been exposed when the lamp 121 first lights, that the sheet sensitive material 42 is being developed and transported when the lamp 121 continues being lit and that all the processes have been completed when the lamp 121 is put out. When the switch SW2 is opened again in this way after the above processes have been completed, the signal level at the point PA of the logic circuit is "1", the signal level at the point PB is "0", the signal level at the point PC is "0", the signal level at the point PD is "0", the signal level at the point PE is "1", the signal level at the point PF is "0", the signal level at the point PG is "0" and the signal level at the point PH is "0", so that the transistor is switched off, whereby the motor 13 stops.

Below the case of the flash light photography in which the contact piece 18 is connected between the conductive pieces STc and STb will be explained in accordance with FIG. 11(a)-2. When the main switch SW$_M$ is closed in the state in which the pin 71 on the leading shutter curtain 60 is engaged with the engaging claw part 69a of the lever 69 while the trigger button 1F is not pushed down, the transistors 116, 117 and 118 are switched off. When the transistor 116 is switched off the magnet Mg2 is not excited so that the detecting lever 2 is rotated around the pin 3 by means of the strength of the spring 6 in the counterclockwise direction whereby the engaging part 2b of the detecting lever 2 is positioned in the slide range of the trigger member 80. Consequently, even if the trigger button 1F is pressed in the above mentioned state, the trigger member 80 is in contact with the engaging part 2b of the detecting lever 2, so that the trigger member 80 can not be operated. Thus, the transistors 117 and 118 remain switched off, and the electrical connection of the light measuring time control circuit device with the power source 100 is interrupted. Further, the switch SW3 of the logic circuit is closed while the switch SW2 is opened, so that the signal level at the point PA is "1", the signal level at the point PB is "0", the signal level at the point PC is "1", the signal level at the point PD is "0", the signal level at the point PE is "1", the signal level at the point PF is "0", the signal level at the point PG is "0" and the signal level at the point PH is "0", so that the transistor 120 remains switched on while the transistor 119 is switched off. On the other hand, the transistor 120 is switched on so that the flash light device is electrically connected to the power source 100, so as to start to charge the main condenser 107 and the trigger condenser 110. When a certain amount of charge has been accumulated in the main condenser 107 and the trigger condenser 110 and the neon tube 114 is lit through the bleeder resistances 111, 112 and 113, the transistors 116, 117 and 118 are switched on whereby the magnet Mg2 is excited, being supplied with current, while at the same time the light measuring time control circuit device is electrically connected to the power source 100 in such a manner that the magnet Mg1 is brought in the excited state in the same way as explained in case of the daylight photography. When the magnet Mg2 is excited the bent part 2a of the detecting lever 2 is attracted with the magnet Mg1, whereby the detecting lever 2 is rotated by means of the strength of the spring 6 around the pin 3 in the clockwise direction in such a manner that the engaging part 2b is withdrawn out of the slide range of the trigger member 80, so as to enable the operation of the trigger member 80. When the neon tube 114 is lit, the photographer can easily understand that the aforementioned flash light device 1K has been charged and the detecting lever 2 is in the state for enabling the operation of the trigger member 80. When the photographer, who acknowledges that the neon tube 114 has been lit, operates the trigger button 1F, the switch SW3 is opened by means of the pin 81 on the trigger member 80, while the pin 82 on the trigger member 80 works upon the lever 73 so as to disengage the pin 71 on the leading shutter curtain 60 from the engaging claw part 69a and allows the leading shutter curtain 60 to run. Along with the start of the leading shutter curtain 60 the switch SW1 is closed. Thus, the light measuring time control circuit device starts the counting, while when the leading shutter 60 has run the switch SW4 is closed by means of the switch control part 60c of the leading shutter curtain 60, whereby the switch SW5 is also closed by means of the switch control part 61e of the tail shutter plane 61 so that the trigger condenser 110 is discharged in such a manner that the flash tube 108 is discharged through the trigger coil 104 so as to take a picture under flash light. In case of the flash light photography, the object to be photographed is generally dark. If the flash light device is not used, the time during which the tail shutter curtain 61 starts to run after the leading shutter curtain 60 has run is longer. During flash light photography the neon tube 114 is put out after the operation of the flash tube 108 of the flash light device 1K while the transistors 116, 117 and 118 are switched off so that the magnet Mg1 is brought into the non excited state before the Schmidt trigger circuit 105 is inverted so as to allow the tail shutter curtain 61 to start to run and the switch SW5 is opened. When the tail shutter curtain 61 has run in this way the switch SW2 is closed so as to light the lamp 121, from which the photographer can learn that the tail shutter curtain 61 has run so as to complete the exposure. When then the photographer, who has confirmed that the lamp 121 is lit, releases the trigger button 1F, the switch SW2 is closed. When the switch SW3 is closed while the lamp 121 is being lit, namely the switch SW2 is being closed, the signal level at the point PA of the logic circuit is kept "1", while the signal level at the point PF is kept "1", so that the signal level at the point PG is "1", while the signal level at the point PF is "1", whereby the transistor 119 is switched on while the motor 13 is driven while the transistor 120 is switched off so as to interrupt the current to the flash light device 1K. When then the switch SW2 is closed again after the process completion, the lamp 121 is put out, while the level at the point PH of the logic circuit is "0", so that the transistor 119 is switched off, whereby the motor 13 stops while the transistor 120 is switched on so as to start the current supply to the flash light device 1K.

As explained above, in the third embodiment of the camera in accordance with the present invention the current is supplied to the flash light device 1K and the film feeding motor from a single power source, whereby the current supply to the flash light device 1K is prohibited while the current is supplied to the motor 13. Further, it goes without saying that it is preferable that the operation of the trigger button 1F should be released when the lamp 121 has been lit after the tail shutter curtain 61 has run so as to terminate the exposure and the switch SW2 has been closed and that the next permitted of the trigger button 1F should not be operated before the process has been finished. However, the logic circuit is composed in such a manner that it is prohibited that the motor 13 could be driven even when the operation of the trigger 1F should be released by mistake before the lamp 121 is lit after the completion of the exposure and that the current could be supplied to the motor 13 and the flash light device 1K at the same time even if the trigger button 1F is operated again by mistake while the motor 13 is being driven. This can easily be understood from FIGS. 11(b) and 11(c). Namely, FIG. 11(b) shows the timing chart for prohibiting the current from being supplied to the motor 13 and the flash light device 1K even if the trigger button 1F should be operated again while the motor 13 is being driven, the exposure having been finished and the lamp 121 being lit. In FIG. 11(b), T1 is the time at which the trigger button 1F is operated so as to allow the leading shutter curtain 60 to start to run, T2 the time at which the tail shutter curtain 61 has run so as to complete the exposure, T3 the time at which the operation of the trigger 1F is released, T4 the time at which the trigger button 1F is operated again by mistake so as to close the switch SW3, T5 the time at which the process is terminated and T6 the time at which the operation of the trigger button made by mistake has been released. Namely, from the timing chart shown in FIG. 11(b) it is understood that no current is supplied to the flash light device 1K while the current supply to the motor 13 is continued until the process has been completed even if the trigger button 1F is operated again while the motor is still driven after the exposure.

FIG. 11(c) is the timing chart for showing that the motor could never be driven even if the release button 1F should be actuated by mistake before the lamp 121 is lit after the completion of the exposure. In FIG. 11(c), T7 is the time at which the trigger button 1F is operated so as to open the switch SW3 and release the shutter, T8 the time at which the operation of the trigger button 1F is released so as to close the switch SW3, T9 the time at which the exposure is completed so as to close the switch SW2, T10 the time at which the trigger button 1F is operated again by mistake, T11 the time at which the operation of the trigger button 1F made at the time point T10 is released, T12 the time at which the trigger button 1F is operated again by mistake, T13 the time at which the operation of the trigger button 1F made at the time T12 is released, and T14 the time at which the process has been completed. Namely, from the timing chart shown in FIG. 11(c), it is understood that the motor 13 can not be driven even if the operation of the trigger button 1F is released by mistake before the tail shutter curtain 61 has run, namely the exposure has been completed, while the motor 13 is driven when the trigger button is operated again and released after the tail shutter curtain 61 has run so as to complete the exposure and that no influence is given to the motor 13 even when the trigger button 1F is operated again by mistake after the motor 13 has once started to run.

Figure 12:
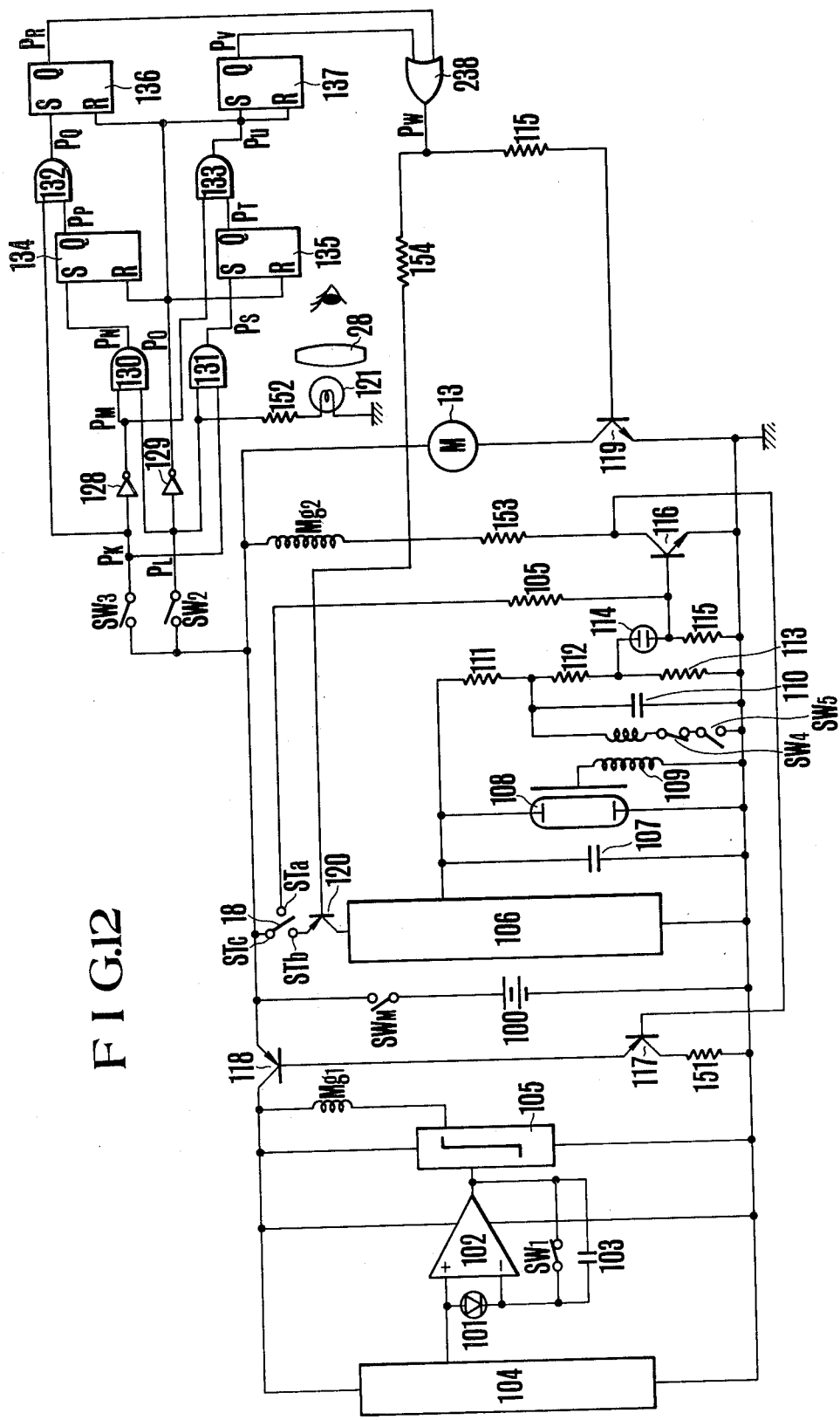
FIG. 12 shows the fourth embodiment of the electrical circuit in accordance with the present invention shown in FIG. 10, whereby a part of the electrical circuit is altered.

FIG. 12 shows the fourth embodiment of the control circuit in accordance with the present invention, whereby the control circuit shown in FIG. 10 is modified. Hereby, the control circuit shown in FIG. 12 differs from that shown in FIG. 10 only in the composition of the logic circuit, whereby other compositions are the same. The members that are the same as those in FIG. 10 are labeled with the same numbers. In FIG. 12, 128 and 129 are the inverter circuits, 130, 131, 132 and 133 the AND gate circuits, 134, 135, 136 and 137 the flip-flop circuits and 138 the OR gate circuit, whereby these circuits constitute the logic circuit. In the same way as in the control circuit shown in FIG. 10, in the circuit shown in FIG. 12, when the OR gate circuit 138 produces the output "0", the transistor 120 is switched on, while the transistor 119 is switched off, so as to supply current to the flash light device, whereby no current is supplied to the motor 13, while when the OR gate circuit 138 produces the output "1", the transistor 120 is switched off, while the transistor 119 is switched on, so as to interrupt the current supply to the flash light device, whereby the current is supplied to the motor 13.

Figure 13:
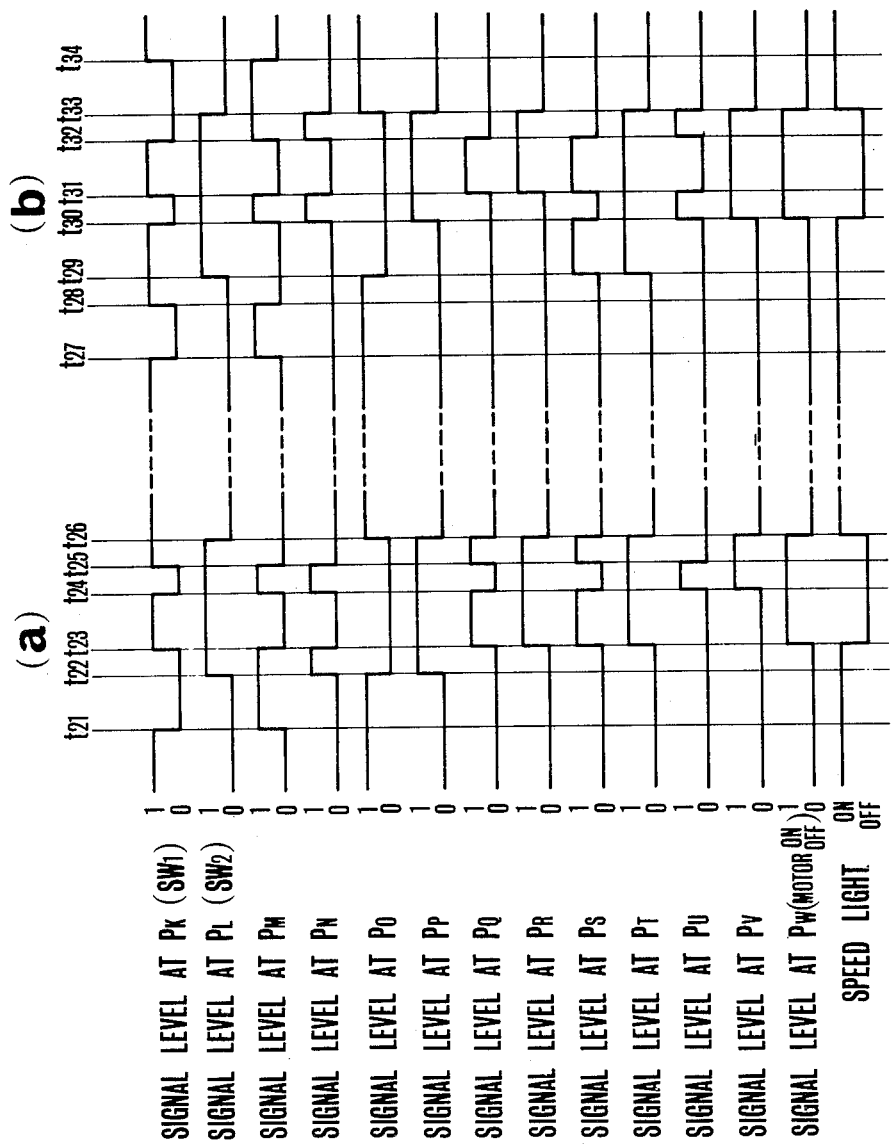
FIG. 13 shows the timing chart of the electrical circuit shown in FIG. 12.

The timing chart of the control circuit shown in FIG. 12 is shown in FIG. 13. In FIG. 13, only the signal level at every point in the logic circuit is shown, whereby others are same as in FIG. 11(a).

Further, the logic circuit in the control circuit shown in FIG. 12 is also designed in such a manner that the motor 13 can not be driven even when the operation of the trigger button 1F is released by mistake before the lamp 121 is lit, the exposure being finished and that the current can not be supplied to the motor 13 and the flash light device 1K at the same time even when the trigger button 1F is operated again by mistake while the motor 13 is being driven.

Namely, FIG. 13(a) shows the timing chart for showing that the simultaneous current supply to the motor 13 and the flash light device 1K is prohibited even when the release button 1K is operated while the motor 13 is being driven after the exposure has been completed so as to light the lamp 121, whereby T21 is the time at which the trigger button 1F has been operated so as to allow the leading shutter curtain 60, T22 the time at which the tail shutter curtain 61 has run so as to complete the exposure, T23 the time at which the operation of the trigger button 1F is released, T24 the time at which the trigger button 1F is operated again by mistake so as to open the switch SW3, T25 the time at which the process has been completed and T26 the time at which the operation of the trigger button 1F made by mistake is released. From this timing chart, it is understood that even when the trigger button 1F is operated again by mistake while the motor 13 is being driven, the current is not supplied to the flash light device 1K but continues to be supplied to the motor 13 until the process has been completed.

FIG. 13(b) shows the timing chart for showing that even if the operation of the trigger button 1F is released by mistake before the tail shutter curtain 61 has run, namely the exposure has be completed, the motor 13 is not driven, while the motor 13 is driven when the trigger button is operated and released after the tail shutter curtain 61 has run so as to complete the exposure, that the motor 13 can not be driven, even if the operation of the trigger button 1F is released before the lamp 121 is lit again by mistake after the motor 13 had once been started and that no current can be supplied to the motor 13 and the flash light device even if the release button 1F is operated again by mistake while the motor 13 is being driven, whereby T27 is the time at which the trigger button 1F is operated so as to open the switch SW3 and release the shutter, T28 the time at which the operation of the trigger button 1F is released so as to close the switch SW3, T29 the time at which the exposure has been completed so as to close the switch SW2, T30 the time at which the trigger button 1F is operated again by mistake, T31 the time at which the operation of the trigger button 1F made at the time T30 is released, T32 the time at which the trigger button 1F is released again by mistake, T33 the time at which the operation of the release button 1F operated at the time T32 is released and T34 the time at which the process has been completed.

The third and the fourth embodiments in accordance with the present invention relate, as explained above, to photographing camera devices in which the current is supplied to the flash light device 1K and the sensitive material motor from a single power source. Such camera devices are provided with a switching means only by means of whose manual operation after the termination of the flash light device the current starts to be supplied to the motor. The current supply to the flash light device 1K is prohibited so as to avoid a large load on the power source while the motor is running to feed the sensitive material in such a manner that the motor 13 can always be driven at a certain determined speed, which is very profitable particularly for a self developing and processing photographing camera device in which the developing and the processing solution has to be spread evenly over the surface of the sensitive material. The camera is also provided with a safety device for locking the trigger device for prohibiting the photographing until the flash light device 1K has been charged in such a manner that such misoperation as operation of the trigger device before the flash light device 1K has completely been charged is impossible.

FIGS. 14 to 17 show the fifth embodiment of the photographing camera in accordance with the present invention. The fifth embodiment in accordance with the present invention relates to a photographing camera device in which the current is supplied to the flash light device and the motor of the sensitive material feeding device from a single common power source, being provided with a change over means by means of which the current is supplied to the flash light device and the motion of the sensitive material feeding device alternatively in such a manner that the motor for the sensitive material feeding device is automatically driven when the flash light photography has been completed while in case of the daylight photography the film is automatically fed without charging the flash light device. Such cameras are also provided with a means for locking the charging of the flash light device while the sensitive material is being fed, by detecting the motor surge current at the starting of the sensitive material feeding and a means for locking the photographing and the sensitive material feeding only when the current is insufficient to be supplied to the flash light photography and the sensitive material feeding in such a manner that the sensitive material can always be fed at a constat speed.

Figure 8:
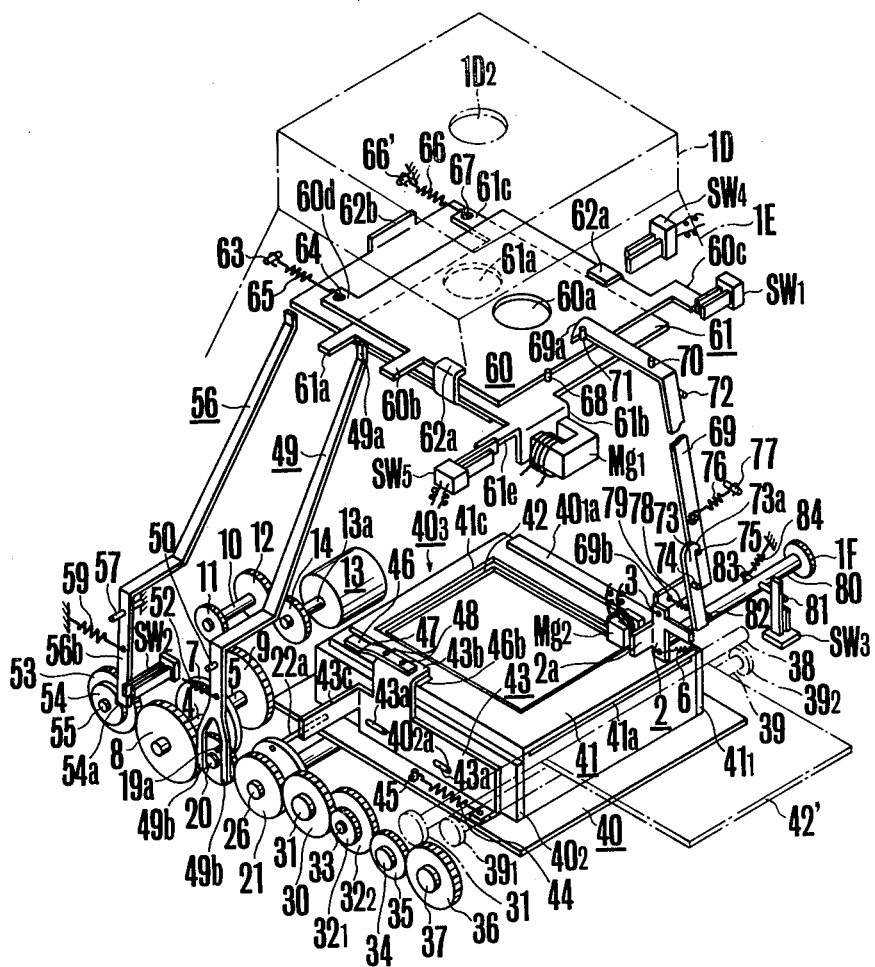
FIG. 8 shows the internal arrangement of the third embodiment of the photographing camera device in accordance with the present invention in perspective view.
Figure 14:
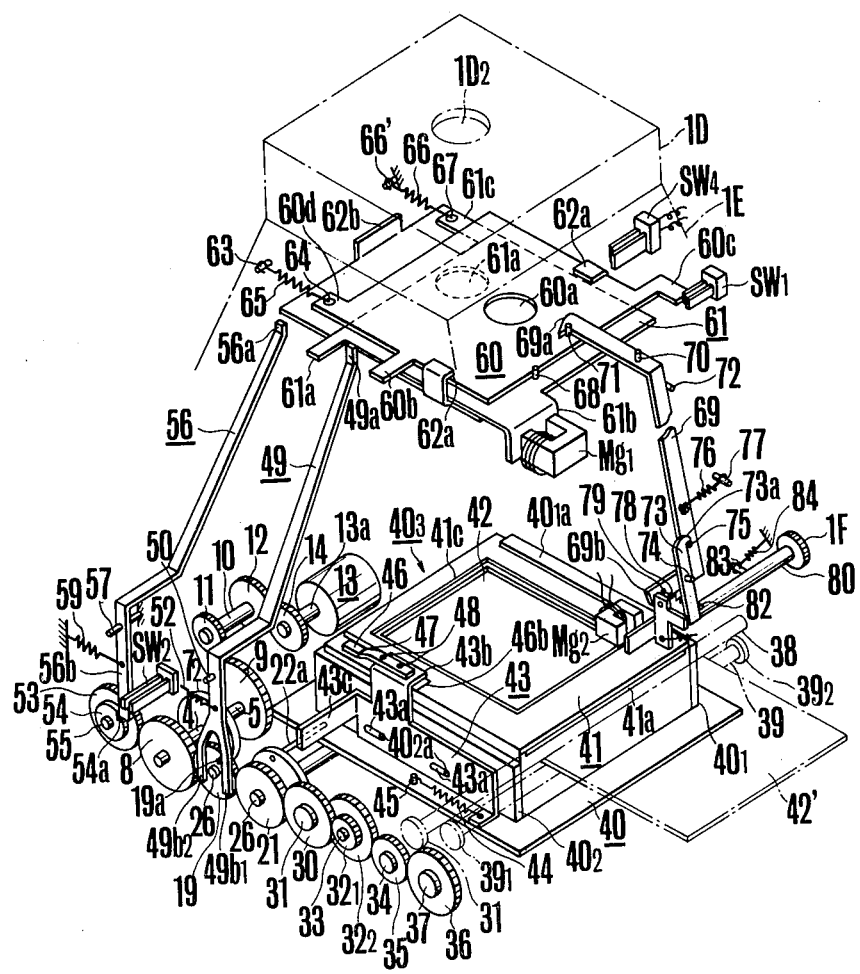
FIG. 14 shows the internal arrangement of the fifth embodiment of the photographing camera device in accordance with the present invention in perspective view.

The mechanism of the fifth embodiment shown in FIG. 14 is almost the same as the embodiments shown in FIGS. 2 and 8, whereby only several parts are modified. The members that are the same as those in FIGS. 2 and 8 are labeled with the same numbers.

Below the outline of the fifth embodiment in accordance with the present invention will be explained in accordance with FIG. 15. In FIG. 15, (1) is the blocking oscillator, (2) the sensitive material feeding charge circuit, (3) the voltage comparator, (4) the switch corresponding to the switch SW2 shown in FIG. 2, (6) the sensitive material feeding driving circuit for driving the sensitive material feeding motor 13, (7) the starting time detecting circuit, (8) the gate circuit, (9) the shutter prohibiting circuit, (10) the error detecting device, (11) the gate circuit, (12) the flash light device charge circuit, (13) the flash light charge completion display device, (14) the X contact corresponding to the switch SW4 shown in FIG. 2, (15) the light measuring circuit, (16) the timing circuit, (17) the shutter control circuit and (18) the power source circuit.

Figure 16:
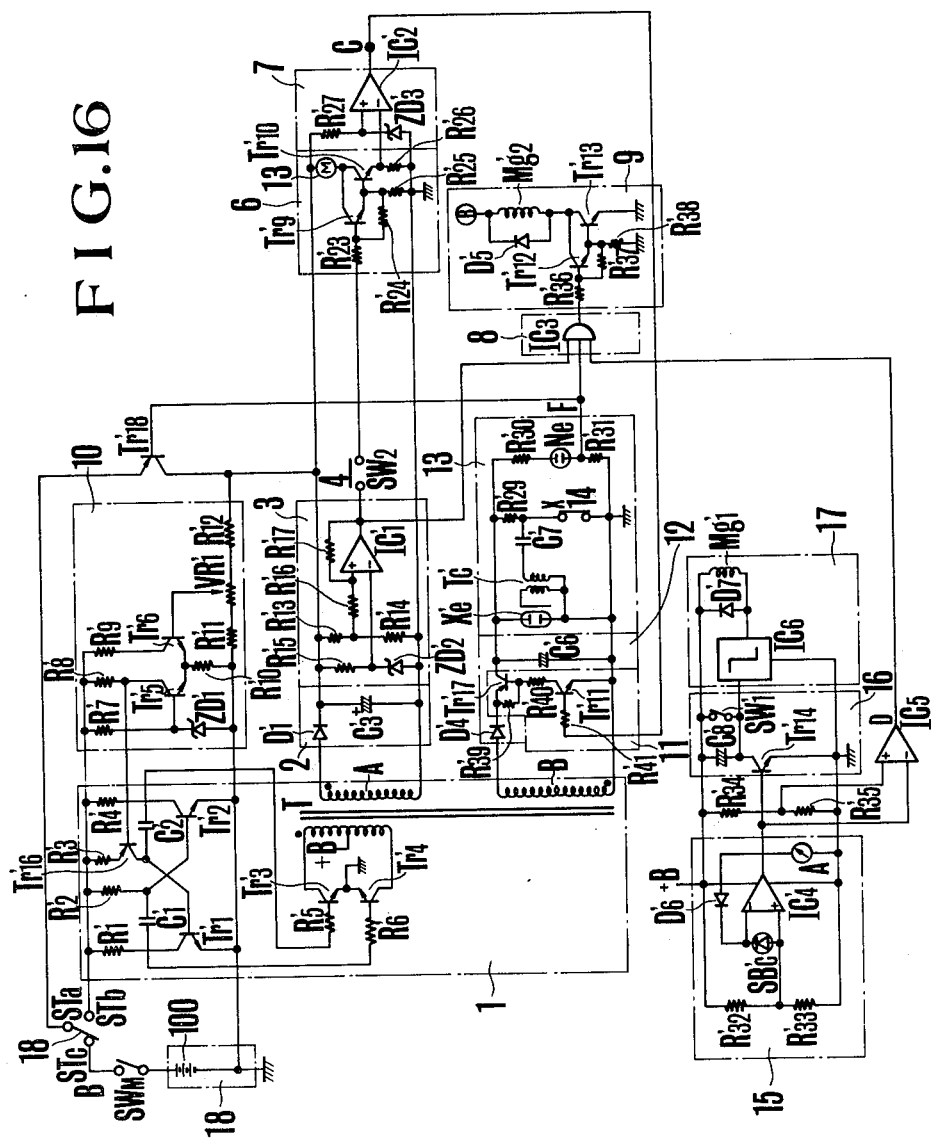
FIG. 16 shows the wirings in detail of the electrical circuit shown in diagram in FIG. 15.

FIG. 16 shows in detail the electrical circuit of the block diagram shown in FIG. 15. The power source 100 shown in FIG. 16 constitutes the electrical circuit (18) shown in FIG. 15, whereby $SW_M$ is the main switch. As the change over means between the daylight photographing mode and the flash light photographing mode, the compositions shown in FIGS. 1 and 9 can be used without modification.

Hereby, the resistances R'1-R'6, the condensers C'1, C'2, the transistors Tr'1-Tr'4, Tr'16 and the oscillation coil T' constitute the blocking oscillator (1). The resistances R'7-R'12, the variable resistances VR'1, the transistors Tr'5, Tr'6, and the Zener diode ZD1 as differenciating amplifier constitute the error detecting device (10) in FIG. 15. When the main switch $SW_M$ is closed and the contact piece 18 is connected between the terminals STc-STa, the multivibrator consisting of the transistors Tr'1, Tr'2 and Tr'10, the condensers C'1, C'2 and the resistances R'1-R'4 starts to operate, whereby the current whose value is determined by the voltage drop in the resistance R'8 of the error detecting device (10) and the resistance R'3 in the blocking oscillator (1) becomes the discharge current of the condenser C'2 in the blocking oscillator (1) and the time during which the transistor Tr'1 in the blocking oscillator is in the switched off state is determined with the discharge current of the condenser C'2 and the capacitor of the condenser C'2. On the other hand, the time during which the transistor Tr'2 is in the switched off state is determined by the time constant of the resistance R'2 in the blocking oscillator (1) and the condenser C'1, while the transistors Tr'1 and Tr'2 are switched-on and switched-off at the frequency of the time constant of the resistance R'2 and the condenser C'1. When the transistor Tr'1 is switched-off, the transistor Tr'4 is switched-on, whereby a current runs through the primary winding of the oscillation transformer T, being supplied by the intermediary tap of the transformer T from the power source (B) in such a manner that a voltage is induced in the secondary winding in accordance with the winding ratio, whereby the part marked with (●) becomes the positive side. On the other hand, when the transistor Tr'2 is switched-off while the transistor Tr'3 is switched-on, whereby a voltage is induced in the secondary winding with the negative side at the part marked ⊙. The diode D'12 and the condenser C'3 constitute the rectifying circuit for power source for the film feeding, namely the sensitive material feeding charging circuit (2) in FIG. 15. The transistors R'13-R'17, the Zener diode ZD'2 and the comparator IC1 constitute the hysteresis comparator, namely the voltage comparator (3) in FIG. 15. The voltage comparator (3) is designed in such a manner that the voltage of the power source of the sensitive material feeding charging circuit (2) is divided by the resistances R'13 and R'14 so as to be input to the positive terminal of the comparator IC1 in order that the standard voltage is delivered to the one terminal of the comparator IC1 from the Zener diode ZD'2, whose output is again positively fed back to the positive terminal of the comparator IC1 through the resistance R'17. The resistances R'23-R'26 and the transistors Tr'9, Tr'10 constitute a motor driving circuit (6) of Darlington composition for driving the sensitive material feeding motor 13, whereby the motor driving circuit (6) is operated with the current stored in the condenser C'3 in the aformentioned sensitive material feeding charging circuit (2) when the switch SW2 to be closed when the tail shutter curtain 61 has run is closed, so as to drive the motor 13. The resistance R'27, the Zener diode ZD'3 and the comparator IC2 constitute the starting time detecting device (7) shown in FIG. 15, whereby device (7), the starting time detecting is so designed that the voltage of the power source of the sensitive material feeding charging circuit (2) is input through the Zener diode ZD'2 in the positive terminal of the comparator IC2, in whose one terminal the voltage of the motor driving circuit (6) is input in such a manner that the surge current of the motor driving circuit (6) taking place at the starting of the motor 13 is detected. The diode D'4, the condenser C'6 constitute the rectifying circuit for the power source of the flash light device, namely the flash light device charging circuit (12). The resistances R'28, R'39, R'40 and the transistors Tr'11, Tr'17 constitute the gate circuit (11) in FIG. 15, whereby the gate circuit (11) is so designed that when the transistors Tr'11, Tr'17 are switched-off when the output terminal of the comparator IC2 is inverted into the low level due to the voltage drop taking place when the surge current of the started sensitive material feeding motor 13 runs through the resistance R'26 of the starting time detecting device (7) the transistors Tr'11 and Tr'17 are switched-off so as to interrupt the charging of the flash light device charging circuit (12). The flash light emitting discharge tube Xe, the trigger induction coil Ic, the trigger condenser C'7, the resistances R'29-R'31 and the neon tube Ne constitute the flash light device charge completion display device (13) in FIG. 15, whereby (14) is the switch corresponding to the switch SW4 shown in FIG. 14, designed to be closed when the leading shutter curtain 60 has run. The neon tube Ne of the flash light charge completion display device (13) is lit when the main condenser C'6 in the flash light charge circuit (12) and the trigger condenser C'7 are sufficiently charged so as to display that the flash light device can be used in the normal state. The flash tube Xe operates when the leading shutter curtain 60 has run, the trigger button 1F being operated in the state in which the neon tube Ne is lit, whereby the switch SW4 is closed, as is conventional for the flash light device. The operational amplifier IC4, the resistances R'32, R'33 for supplying the standard signal to the positive terminal of the operational amplifier IC4, the light sensing device SBC for converting the brightness of the object to be photographed into the electrical signal, the diode D'6 for logarithmically compressing the aforementioned electrical signal electrically converted with the light sensing device SBC and amplified with the operational amplifier IC4 and a meter displaying the shutter time corresponding to the brightness of the object to be photographed constitute the light measuring circuit (15) in FIG. 15. The magnet Mg1 corresponds to that shown in FIG. 13, being intended for holding the tail shutter curtain 61 in the charged state. D'7 is the diode for absorbing the voltage inversedly induced in the magnet Mg1 while IC6 is the comparator for controlling the conductivity and the non-conductivity of the magnet Mg1, whereby the magnet Mg1 and the diode D'7 constitute the shutter control circuit (17) in FIG. 15. The condenser C'8, the transistor Tr'14 for logarithmically enlarging the signal logarithmically compressed with the diode D'6 and charging the condenser C'8 and the switch SW1 constitute the timing circuit (16) in FIG. 15. By means of this timing circuit (16) the condenser C'8 is charged with the current corresponding to the brightness of the object measured by means of the light measuring circuit (15) along with the switch SW1 to be closed when the leading shutter curtain 60 starts to run, whereby when the voltage of the condenser C'8 becomes higher than the threshold voltage of the comparator IC6 thereby inverting the comparator so as to bring the magnet in the non-conductive state. The resistances R'34 and R'35 are intended for supplying the standard voltage to the positive terminal of the comparator IC5, which compares the standard voltage input to the output signal of the operational amplifier IC4 input to the positive terminal so as to produce a low level output when the output signal of the operational amplifier IC4 becomes lower than the standard voltage. IC3 is the AND gate circuit corresponding to the gate circuit (8) in FIG. 15, being provided with the input terminal connected to receive the output of the voltage comparator (3), the input terminal connected to receive the output of the flash light device charge completion display device (13), the input terminal connected to receive the output of the comparator IC5 and the output terminal connected to the input terminal of the shutter prohibiting the circuit (9). The AND gate circuit IC3 is so designed that the proper exposure can be obtained when the flash light device has been charged so as to light the neon tube Ne, that when the output of the comparator IC5 becomes of high level and when the sensitive material feeding charging circuit (2) has been charged the gate is opened so as to bring the transistors Tr'12 and Tr'13 of the shutter prohibiting circuit (9) in the switched on state in order to bring the magnet Mg2 in the conductive state. Tr'18 is the transistor which switched-on, when the contact piece 18 is connected between the contacts STc-STa, so designed that the AND gate circuit IC3 is opened when the transistor Tr'18 is switched-on.

Figure 17B:
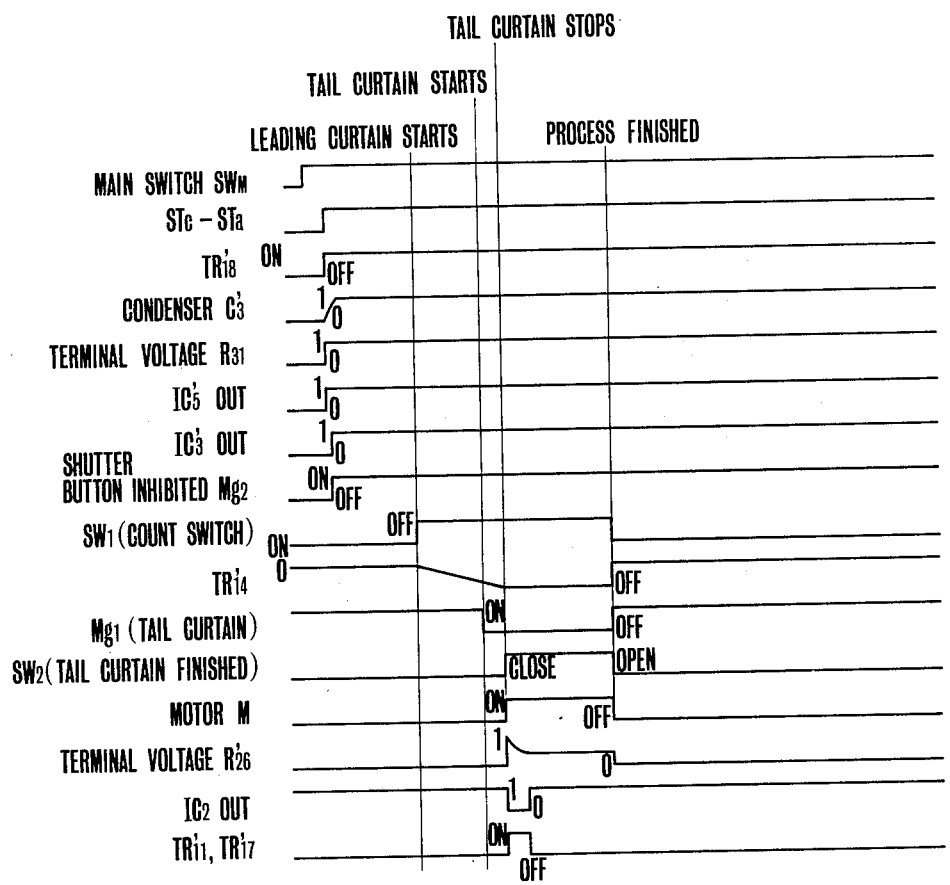
FIG. 17 shows the timing chart of the electrical circuit shown in FIG. 16.

FIG. 17 shows the timing chart of the fifth embodiment of the photographing camera device, whereby FIG. 17(a) relates to the flash light photography while FIG. 17(b) relates to the daylight photography. Below the operation of the fifth embodiment of the photographing camera device in accordance with the present invention in case of the flash light photography and that in case of the daylight photography without using the flash light device will be explained in accordance with the timing chart shown in FIG. 17.

(A) Flash light photography.

When at first the main switch $SW_M$ is closed, a current runs through the shutter control circuit (17) so as to bring the magnet MG1 in the conductive state, while the photo conductive element SBC of the light measuring circuit (15) converts the brightness of the object to be photographed into an electrical signal, which is amplified by means of the comparator IC4 and then logarithmically compressed by means of the log. diode D'6 so as to display the proper shutter time by means of the meter, while being logarithmically enlarged by means of the transistor Tr'14. When after the main switch $SW_M$ has been closed, the photographing mode changeover dial 1H is rotated so as to set the indicator 1H4 at the mark "S" of the index 1J in order to connect the contact piece 18 between the conductive pieces STa and STc, the multivibrator consisting of the transistors Tr'1, Tr'2 and Tr'16, the condenser C'1 and C'2 and the resistances R'1–R'4 in the blocking oscillator (1) starts to operate in such a manner that a voltage is induced in the coils A and B alternatively and periodically. In this state the switch SW2 is still in the opened state while the current supply to the sensitive material feeding driving circuit (6) is interrupted, so that the output at the point C of the comparator IC2 of the starting time detecting device (7) is the high level signal "1", whereby the transistors Tr'11 and Tr'17 are switched-on. Further the power source (B) is connected to the light measuring circuit (15), while the standard voltage obtained with the resistances R'34 and R'35 and the output signal of the comparator IC4 are compared in the comparator IC5 with each other, whereby when the result of the comparison is normal the output signal at the point D is "1". Hereby, a voltage is induced alternatively in the coil A and the coil B by means of the multivibrator in such a manner that the voltage induced in the coil A is charged in the condenser C'3 through the rectifying diode D'1, while the voltage induced in the coil B is charged in the condensers C'6 and C'7 through the rectifying fiode D'4 and the transistor Tr'17 at each cycle. When the charge sufficient enough to drive the motor 13 has been loaded in the condenser C'3 by means of the voltage induced in the coil A, the output level of the comparator IC1 (signal level at the point E) becomes "1", while when the charge sufficient enough to drive the flash tube Xe has been loaded in the condensers C'6 and C'7 by means of the voltage induced in the coil B, the neon tube Ne is lit, the signal level at the point F becomes "1" and the gate of the gate circuit IC3 is opened so as to bring the magnet Mg2 in the non-conductive state. Namely, in case the magnet Mg2 is in the non-conductive state, the detecting lever 2 has been moved by means of the biassing force of the spring 6 in the counterclockwise direction, whereby an engaging member 2b is arranged in the slide domain of the trigger member 80, so that even if the trigger button 1F is pressed, the trigger member is in contact with the engaging part 2b of the detecting lever 2 so as to prohibit the trigger operation. On the other hand, when the magnet Mg2 is in the conductive state, the detecting lever 2 is attracted against the biassing force of the spring 6 by means of the attracting force of the magnet Mg2 in such a manner that the engaging part 2b of the detecting lever 2 is rotated out of the slide range of the trigger member. When the trigger button 1F is operated in this state, the pin 82 on the trigger member 80 works upon the lever, whereby the working strength is transmitted to the lever 69 through the pins 74 and 75, so as to rotate the lever 69 around the pin 70 and disengage the pin 71 on the leading shutter curtain 60 from the engaging member 69a. When the pin 71 on the leading shutter curtain 60 is disengaged from the engaging member 69a, the leading shutter curtain 60 starts to run by means of the tension in the spring 65 until it comes in contact with the control bent part 62b of the holding plate 62, so as to open the switch SW1 and close the switch SW4. However, the magnet Mg2 is still in the conductive state, the tail shutter curtain 61 is kept at the charged position. When the switch SW4 is closed, the flash tube Xe operates, while the switch SW1 is opened the timing circuit (16) operates, whereby when the voltage of the charged condenser C'3 becomes higher than the threshold value of the comparator IC6, the comparator IC6 is inverted so as to bring the magnet Mg1 in the non-conductive state. When the magnet Mg1 is brought in the non-conductive state, the tail shutter curtain 61 is released and starts to run by means of the tension charged in the spring 66 until it comes in contact with the control bent part 62b of the holding part 62, whereby immediately before the tail shutter curtain 61 has been in contact with the control bent part 62b of the holding plate 62 the engaging part 61d of the tail shutter curtain 61 works upon the lever 56 so as to rotate the lever 56 around the pin in the counterclockwise direction. When the tail shutter curtain has run, the alignment of the opening 60a of the leading shutter curtain 60 with the opening 61a of the tail shutter curtain 61 does not exist any more so as to terminate the exposure to the sheet shaped sensitive material 42. When the tail shutter curtain 61 has run the engaging part 61d of the tail shutter curtain 61 works upon the lever 56 so as to rotate the lever 56 in the counterclockwise direction in such a manner that the one end 56b of the lever 56 is brought out of the concave part 54a of the cam member 54 so as to close the switch SW2. The transistors Tr'11 and Tr'17 are in the switched-on state until the switch SW2 is brought in the closed state, and the voltage periodically induced in the coil B is charged in the condensers C'6 and C'7, whereby along with the closing of the switch SW2 the energy charged in the condenser C'3 in the sensitive material feeding charging circuit (2) is supplied to the sensitive material feeding driving circuit (6) so as to drive the motor 13. Hereby the surge current at the starting of the motor 13 runs through the resistance R'26 in such a manner that the output of the output terminal (signal level at the point C) of the comparator IC2 is inverted into the low level output "0" by means of the voltage drop in the resistance R'26 so that the transistors Tr'11 and Tr'17 are switched-off so as to interrupt the charging of the condensers C'6 and C'7, only allowing the charging of the condenser C'3. The rotation of the motor 13 thus driven is transferred to the rotation shaft 5 through the gears 14, 12, 11 and 9 and further to the rotation shaft 4 through the one way clutch 7 so as to rotate the gear 8. The rotation of the gear 8 is transferred to the gear 53, whereby the cam member 54 integral with the gear 55 rotates while at the same time, the gear 19 engaged with the gear 8 is rotated. The rotation of the gear 19 is further transferred to the gear 31 through the gears 21, 30, $32_1$, $32_2$, 35 and 36. The rotation of the gear 31 is transferred to the rolls 38 and 39, while the rotation of the gear 21 is transferred to the disc 22 in such a manner that the long pin 22a on the disc 22 works upon the engaging part 43c of the base plate 43, so as to move the base plate to the right in FIG. 2. Hereby, along with the movement of the base plate 43 the first, just exposed, sheet shaped sensitive material 42 on the cartridge 41 engaged with the friction material 47 of the plate spring 46 is discharged out of the discharge opening 41a by means of the feeding effect of the plate spring 46 secured on the base plate 43 until the front end is clamped between the rolls 38 and 39. When the front end of the sheet shaped sensitive material 42 is clamped between the rolls 38 and 39 the sheet shaped sensitive material 42 is discharged out of the sensitive material discharging opening IC1 only by means of the rotation of the rolls 38 and 39, whereby the developing processing solution container in the sheet shaped sensitive material 42 is broken between the rolls so as to distribute the developing processing solution coming out of the container over the surface of the sensitive material and carry out the self developing and processing. Further, when along with the rotation of the gear 8, the gear 19 is rotated, the shutter charge lever 49 is rotated by means of the pin 19a on the gear 19 around the pin 50 along the clockwise direction so as to charge the leading and the tail shutter curtains 60 and 61. Namely, when the shutter charge lever 49 is rotated by means of the pin 19a on the gear 19 in the clockwise direction, the one end 49 of the lever 49 is engaged with the engaging part 60b of the leading shutter curtain 60, so as to move the leading shutter curtain 60 to the right in FIG. 14 against the biassing force of the spring 65. When the leading shutter curtain 60 is moved to the right, the leading shutter curtain 60 has been engaged with the pin 68 on the tail shutter curtain 61 so that the leading and the tail shutter curtains 60 and 61 are moved to the right in FIG. 14 against the biassing force of the springs 65 and 66 until the pin 71 on the leading shutter curtain 60 is engaged with the engaging claw 69a of the holding lever 69, so as to complete the shutter charging.

On the other hand, when along with the rotation of the gear 8 the gear 53 is rotated and the cam member 54 integral with the gear 53 starts to rotate the other end 56b of the lever 56 comes in contact with the part with large diameter of the cam member 54, when the lever 56 has been rotated in the counterclockwise direction until the concave part 54a of the cam member 54 is again in contact with the other end 56b of the lever 56 so as to keep the switch SW2 in the closed state. Namely, the time during which the aforementioned cam member 54 controls the lever 56 so as to change over the switch SW2 from the closed state to the opened state is chosen in advance so as to correspond to that during which the shutter charge lever 49 completes the shutter charging as well as that during which the sheet shaped sensitive material 42 is completely discharged.

The next charging of the aforementioned flash light device charging circuit takes place when the surge current running through the resistance R'26 at the starting of the motor 13 disappears, the voltage is stabilized and the output at the output terminal of the comparator IC29 is inverted into "1" so as to switch on the transistors Tr'11 and Tr'17.

(B) Daylight photography.

When the main switch $SW_M$ is closed, the current is supplied to the shutter control circuit 17 so as to bring the magnet Mg1 in the conductive state. When the photographing mode change over dial 1H is operated in such a manner that the indicator 1H1 is set at the mark "D" on the index 1J so as to connect the contact piece 18 between the conductive piece STb and STc after closing the main switch $SW_M$, current supply to the blocking oscillator (1) is interrupted while the voltage of the power source 100 is applied on the emitter circuit of the transistor Tr'18, whereby the base current of the transistor Tr'18 runs through the resistance R'31, keeping the gate circuit IC39 in the opened state so as to supply current to the sensitive material feeding charging circuit (2) from the power source 100. While the gate of the gate IC3 is opened, the magnet Mg2 is in the conductive state so that the operation of the trigger button 1F is enabled.

When the trigger button 1F is operated in this state, the pin 71 on the leading shutter curtain 60 is disengaged from the holding member 69a of the lever 69 in the same way as in the aforementioned case of the flash light device so the leading shutter curtain 60 starts to run, while the switch SW1 is brought in the opened state. Further, when the leading shutter curtain 60 has run, the switch SW4 is closed, whereby the flash light device has been enabled by the change over of the photographing mode change-over dial 1H so that the flash tube Xe does not operate. Further, when the switch SW1 is opened along with the running of the leading shutter curtain 60, the timing circuit (16) starts to operate so as to bring the magnet Mg1 in the non-conductive state after the lapse of a certain time determined by means of the timing circuit (16) and the light measuring circuit (15) in such a manner that the tail shutter curtain 61 starts to run to complete the exposure, while the motor 13 is driven in the same way as in the aforementioned case of the flash light photography so as to complete the process.

As explained above, the fifth embodiment relates to the current supply control device for the photographing camera device in which the current is supplied to the sensitive material feeding device and the flash light device 1K from a single common power source, being provided with a change over means by means of which the current supply to the flash light device and the sensitive material feeding device is made alternatively, whereby a photograph has been taken under the flash light with the energy stored in the flash light device the aforementioned sensitive material is automatically fed, while in case of the daylight photography the sensitive material is automatically fed immediately after the completion of photographing without charging the aforementioned flash light device, a means by means of which the surge current of the motor at the start of the sensitive material feeding is detected so as to interrupt the charging of the flash light device during the sensitive material feeding and a means by means of which the flash light photography and the sensitive material feeding is made impossible only when the stored energy is insufficient for the flash light photography and the sensitive material feeding, in such a manner that the sensitive material can always be fed at a constant speed, which is remarkably profitable for the practical application, the inferior influence upon the sensitive material arising from the instable feeding speed being eliminated.

Although, hereby, the embodiments of the present invention are explained as instant photographing camera device having a rechargeable electronic flash light device, the present invention is not always limited to the instant photographing camera device but widely applicable to the photographing camera device in which the film winding up as well as the shutter charge are automatically carried out by means of a driving motor. Further, although the aforementioned flash light device 1K is explained as incorporated in the camera body 1, the flash light device is not always necessary to be built in the camera body but also applicable to a photographing camera device being designed in such a manner that on a part of the camera body a mounting means, on which the flash light device can selectively and dismountably be mounted, is provided, whereby the terminals of the flash light device can be connected to the terminals connected to the film feeding motor 13 and the power source. Thus, the claims are not limited to the aforementioned embodiments.

What is claimed is:
1. A photographic camera device comprising:
   (a) a power supply;
   (b) a camera housing having a film receiving chamber;
   (c) a shutter means for exposing film loaded in the chamber;
   (d) a film transport means for transporting the film after exposure, said means having an electric motor to be operated with the power from the power supply;
   (e) a first switching means for controlling the current supply to the motor from the power supply, said first switching means being operatively engaged with the shutter means in such a manner that the power is supplied from the power supply to the motor in response to the completion of the exposure of the film by the shutter means;
   (f) a rechargeable electronic flash unit to be operated with the power of the power supply;
   (g) a second switching means for controlling the current supply from the power supply to the flash unit;
   (h) a detecting means for detecting the voltage of the power supply;
   (i) a control means for controlling the second switching means, said control means being operatively engaged with the first switching means and the detecting means; for
      (1) allowing the closing of the second switching means along with the closing of the first switching means in response to a voltage of the power supply, detected by means of the detecting means that is higher than a predetermined reference voltage; and for
      (2) controlling the second switching means so as to prohibit the closing of the second switching means while the first switching means is being closed, in response to a voltage of the power supply, detected by means of the detecting means lower than the predetermined reference voltage.

2. A photographic camera device, comprising:
   (a) a power supplying circuit;
   (b) an electric film transport motor to be operated with the power of the power supplying circuit;
   (c) a first switching means for controlling the current supply from the power supplying circuit to the motor;
   (d) a rechargeable electronic flash unit to be operated with the power of the power supplying circuit;
   (e) a second switching means for controlling the current supply from the power supplying circuit to the flash unit;
   (f) a detecting means for detecting the voltage of the power supplying circuit;
   (g) a control means operative in response to the detecting means for
      (1) enabling the closing of the second switching means and the first switching means in response to a voltage of the power supplying circuit higher than a predetermined reference voltage; and for
      (2) preventing the concurrent closing of the second switching means and the first switching means while permitting an alternate closing of said first and second switching means in response to a voltage of the power supplying circuit that is lower than the predetermined reference voltage.

3. A camera device in accordance with claim 1, wherein the detecting means includes a reference voltage producing means for producing said predetermined reference voltage and a comparison means supplied with the output of said reference voltage producing means and the output of the power supplying circuit unit for comparing both outputs with each other.

4. A camera device in accordance with claim 1, wherein the second switching means comprises an electronic switch having transistors.

5. A camera device in accordance with claim 1, wherein the control means includes a one shot circuit.

6. A camera device in accordance with claim 1, wherein the flash unit comprises:
   a storage capacitor;
   means responsive to an applied voltage for charging the capacitor;
   an electronic flash tube; and
   circuit means responsive to an applied trigger signal for discharging the capacitor through the discharge tube to produce an illuminating flash of light.

7. A photographic camera device, comprising:
   (a) a camera housing having a film receiving chamber;
   (b) a power supply in the housing;
   (c) a trigger in the housing;
   (d) a shutter means for exposing the film loaded in the chamber, said shutter means including:
      a first shutter curtain participating in the start of the exposure of the film and actuable in response to the operation of the trigger means; a second shutter curtain participating in the termination of the exposure of the film; and a sequence means for controlling the sequence of operation of said first and second shutter curtains in such a manner that the operation of the second shutter curtain takes place after that of the first shutter curtain, said sequence means operating in response to the termination of operation of the first shutter curtain;

(e) a film transport means operating in response to the termination of operation of the second shutter curtain, for transporting the film, said film transport means including an electronic motor to be operated with the power of the power supply;

(f) a rechargeable electronic flash unit to be operated with the power of the power supply;

(g) a second switching means for controlling the current supply from the power supply to the flash unit;

(h) a detecting means for detecting the voltage of the power supply;

(i) a control means controlling the second switching means and being operatively engaged with the first switching means and the detecting means for (1) allowing the closing of the second switching means along with the closing of the first switching means in response to a voltage of the power supply, detected by means of the detecting means that is higher than a predetermined reference voltage; and for (2) controlling the second switching means so as to prohibit the closing of the second switching means while the first switching means is being closed while permitting an alternate closing of said first and second switching means, in response to a voltage of the power supply, detected by means of the detecting means that is lower than the predetermined reference voltage.

8. A camera device in accordance with claim 7, wherein the shutter means includes a prohibiting means operatively engaged with the detecting means for prohibiting the trigger means in case the voltage of the power supply is lower than a certain determined voltage.

9. A camera device in accordance with claim 7, wherein the detecting means includes a reference voltage producing means for producing a reference voltage and a comparison means being supplied with the output of the reference voltage producing means and the output of the power supply for comparing both outputs with each other.

10. A camera device of a self-development-processing type using a sheet-like photosensitive material which has a development processing solution and which, after exposure to light, forms a visible image through a development process carried out with the development processing solution contained in said storage capsule, the camera device comprising:

(a) a camera housing having a photosensitive material-receiving chamber;

(b) a power supply in the housing;

(c) a trigger;

(d) an exposure means for exposing the photosensitive material loaded in the chamber, said exposure means operating in response to the operation of the trigger;

(e) a photosensitive material carrying means which is provided with a motor operated by the power of the power supply for forwarding the photosensitive material after exposure to the light thereof, then allowing the exposed material to be processed with the development processing solution and then carrying the processed material to the outside of the camera housing, said carrying means operating in response to the operation of the termination of the exposure means;

(f) a rechargeable electronic flash unit to be operated with the power of the power supply, said unit including:

a storage capacitor; means responsive to an applied voltage for charging the capacitor; an electronic flash tube; and circuit means responsive to an applied trigger signal for discharging the capacitor through the discharge tube to produce an illuminating flash of light, said circuit means operating in response to the exposure means;

(g) a detecting means for detecting the voltage of the power supply;

(h) a control means controlling the current supply to the motor and the charging means in response to the detecting means for (1) allowing the simultaneous current supply to the motor and the charging means in response to a voltage of the power supply that is higher than a predetermined reference voltage; and for (2) prohibiting the current supply at least to the charging means while the current is being supplied to the motor and permitting the current supply to the charging means after the current is no longer supplied to the motor in response to a voltage of the power supply that is lower than the predetermined reference voltage.

11. A camera device in accordance with claim 10, wherein the flash unit includes a switching means for selectively disconnecting the flash unit electrically from the power supply 12. A camera device in accordance with claim 10, wherein the detecting means includes a reference voltage producing means for producing the reference voltage and a comparison means connected to an output of the reference voltage producing means and the output of the power supply for comparing both outputs with each other.

13. A camera device in accordance with claim 10, wherein the exposure means includes a prohibiting means operatively engaged with the detecting means for prohibiting the operation of the trigger means, in response to a voltage of the supply that is lower than a certain determined voltage.

* * * * *